US012529983B2

(12) United States Patent
Osuka et al.

(10) Patent No.: US 12,529,983 B2
(45) Date of Patent: Jan. 20, 2026

(54) IMAGE FORMING APPARATUS INCLUDING MAIN BODY CASING, FIXING DEVICE ATTACHABLE THERETO, AND SPRING CONFIGURED TO PRESS BOSS OF FIXING DEVICE IN ATTACHED STATE TO MAIN BODY CASING

(71) Applicant: BROTHER KOGYO KABUSHIKI KAISHA, Nagoya (JP)

(72) Inventors: Misato Osuka, Nagoya (JP); Daisuke Ishizuka, Nagoya (JP); Shota Iriyama, Toyokawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/778,464

(22) Filed: Jul. 19, 2024

(65) Prior Publication Data

US 2025/0060692 A1 Feb. 20, 2025

(30) Foreign Application Priority Data

Aug. 16, 2023 (JP) ................................ 2023-132626

(51) Int. Cl.
*G03G 15/20* (2006.01)
*G03G 21/16* (2006.01)

(52) U.S. Cl.
CPC ..... *G03G 15/2017* (2013.01); *G03G 15/2064* (2013.01); *G03G 21/1647* (2013.01)

(58) Field of Classification Search
None
See application file for complete search history.

(56) References Cited

U.S. PATENT DOCUMENTS

2006/0078235 A1* 4/2006 Chen .................... A47B 88/493 384/18
2011/0280507 A1* 11/2011 Yu ........................ H05K 7/1489 384/21
2012/0061551 A1* 3/2012 Zhang .................... A47B 88/57 248/560
2012/0093523 A1* 4/2012 Kamoshida ........ G03G 21/1875 399/13

(Continued)

FOREIGN PATENT DOCUMENTS

JP 2009251347 A * 10/2009
JP 2008-275899 A 11/2018

(Continued)

*Primary Examiner* — Sevan A Aydin
(74) *Attorney, Agent, or Firm* — Merchant & Gould P.C.

(57) ABSTRACT

An image forming apparatus includes a main body casing, a fixing device, and a spring. The fixing device is attachable to the main body casing from one side toward an other side in a first direction. The main body casing includes a first recessed portion recessed toward one side in a second direction crossing the first direction. The fixing device includes a first boss extending in a third direction crossing the first direction and the second direction. The first boss is configured to be inserted in the first recessed portion in a state where the fixing device is attached to the main body casing. The spring is configured to press, in the state where the fixing device is attached to the main body casing, the first boss inserted in the first recessed portion toward the one side in the first direction and the one side in the second direction.

12 Claims, 11 Drawing Sheets

(56) References Cited

U.S. PATENT DOCUMENTS

| | | | | |
|---|---|---|---|---|
| 2014/0086627 | A1* | 3/2014 | Tanabe | H04N 23/6812 399/111 |
| 2018/0333974 | A1 | 11/2018 | Yamano et al. | |
| 2024/0264555 | A1* | 8/2024 | Imaeda | G03G 15/2064 |
| 2025/0021044 | A1* | 1/2025 | Matsuda | G03G 21/12 |

FOREIGN PATENT DOCUMENTS

| | | | | |
|---|---|---|---|---|
| JP | 2018-194824 | A | 12/2018 | |
| JP | 2019-124969 | A | 7/2019 | |
| JP | 2021-107852 | A | 7/2021 | |
| WO | WO-2006109579 | A1 * | 10/2006 | A47B 88/047 |

* cited by examiner

IMAGE FORMING APPARATUS INCLUDING MAIN BODY CASING, FIXING DEVICE ATTACHABLE THERETO, AND SPRING CONFIGURED TO PRESS BOSS OF FIXING DEVICE IN ATTACHED STATE TO MAIN BODY CASING

REFERENCE TO RELATED APPLICATIONS

This application claims priority from Japanese Patent Application No. 2023-132626 filed on Aug. 16, 2023. The entire content of the priority application is incorporated herein by reference.

BACKGROUND ART

There has conventionally been known an image forming apparatus including a main body casing and a fixing device that is attachable to and detachable from the main body casing. In this technology, the main body casing has a support groove and a wire spring. The support groove extends in the front-rear direction and supports a support shaft of the fixing device. The wire spring urges the support shaft downward to make the support shaft in contact with the bottom edge of the support groove.

SUMMARY

In the conventional image forming apparatus, there has been a possibility that the fixing device may move in the front-rear direction from an attached position in which the fixing device is attached to the main body casing. Therefore, it is desirable to suppress the fixing device from moving from the attached position to the main body casing.

In view of the foregoing, it is an object of the present disclosure to provide an image forming apparatus in which a fixing device can be suppressed from moving from an attached position in which the fixing device is attached to a main body casing.

In order to attain the above and other objects, according to one aspect, the present disclosure provides an image forming apparatus including a main body casing and a fixing device. The fixing device includes a heating rotary body and a pressure rotary body. The fixing device is attachable to the main body casing from one side toward an other side in a first direction. The main body casing includes a first recessed portion recessed toward one side in a second direction. The second direction crosses the first direction. The fixing device further includes a first boss. The first boss extends in a third direction. The third direction crosses both the first direction and the second direction. The first boss is configured to be inserted in the first recessed portion in a state where the fixing device is attached to the main body casing. The image forming apparatus further includes a spring. The spring is configured to press, in the state where the fixing device is attached to the main body casing, the first boss inserted in the first recessed portion toward both the one side in the first direction and the one side in the second direction.

In the above structure, in the state where the fixing device is attached to the main body casing, the spring presses, toward both the one side in the first direction and the one side in the second direction, the first boss inserted in the first recessed portion. Accordingly, the fixing device can be suppressed from moving from an attached position in which the fixing device is attached to the main body casing.

DESCRIPTION

Figure 1:
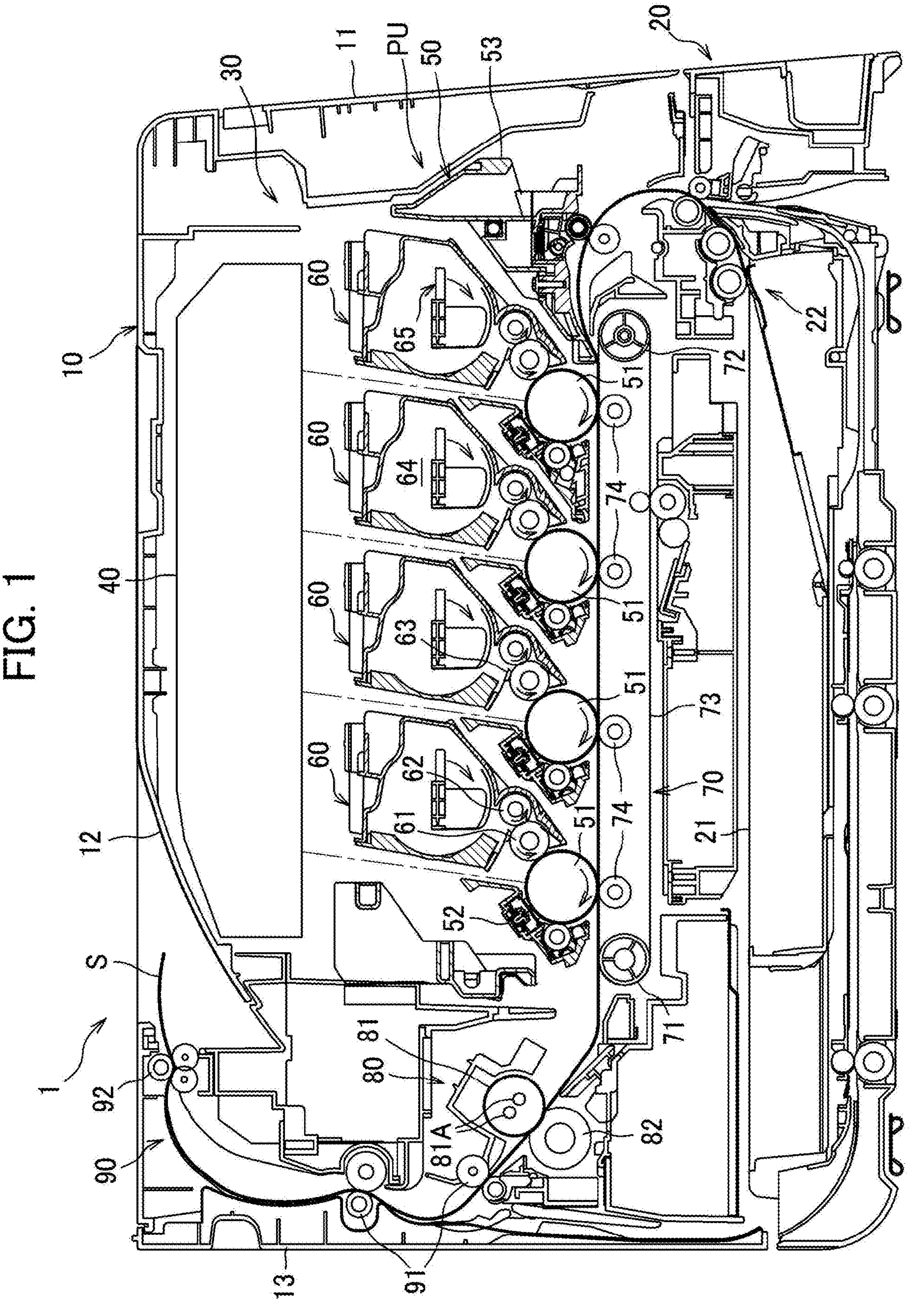
FIG. 1 is a cross-sectional view of an image forming apparatus.

Next, an image forming apparatus 1 according to an embodiment of the present disclosure will be described. As illustrated in FIG. 1, the image forming apparatus 1 includes a main body casing 10, a sheet-feeding section 20, an image-forming section 30, and a sheet discharging section 90.

The main body casing 10 includes a front cover 11, a discharge tray 12, and a rear cover 13. The front cover 11 is configured to open and close an opening formed at the front end of the main body casing 10. The rear cover 13 is configured to open and close an opening formed at the rear end of the main body casing 10.

The sheet-feeding section 20 includes a sheet tray 21 and a sheet-feeding mechanism 22. The sheet tray 21 is configured to store therein sheets S, such as sheets of paper. The sheet-feeding mechanism 22 is configured to supply the sheets S in the sheet tray 21 to the image-forming section 30.

The image-forming section 30 includes an exposure device 40, a process unit PU, a transfer unit 70, and a fixing device 80.

The exposure device 40 is positioned above the process unit PU. The exposure device 40 is configured to emit laser beams to expose surfaces of a plurality of photosensitive drums 51 to light.

The process unit PU is positioned between the sheet tray 21 and the exposure device 40. The process unit PU is attachable to and detachable from the main body casing 10 through the opening of the main body casing 10 which is opened by opening the front cover 11. The process unit PU includes a drum cartridge 50 and a plurality of toner cartridges 60.

The drum cartridge 50 includes the plurality of photosensitive drums 51, a plurality of chargers 52 provided for the plurality of photosensitive drums 51, and a drum frame 53.

The drum frame 53 supports the plurality of photosensitive drums 51 and the plurality of chargers 52. The drum frame 53 is supported by the main body casing 10 so as to be movable relative to the main body casing 10. The toner cartridges 60 are attachable to and detachable from the drum frame 53.

The plurality of toner cartridges 60 is configured to store therein toner of different colors from each other. Each toner cartridge 60 includes a developing roller 61, a supply roller 62, a layer-thickness regulation blade 63, a toner storage section 64 configured to store therein toner, and an agitator 65.

The agitator 65 is configured to agitate toner in the toner storage section 64. The agitator 65 is configured to supply toner to the supply roller 62. The supply roller 62 is configured to supply toner to the developing roller 61. The layer-thickness regulation blade 63 is configured to regulate the layer of toner on the developing roller 61 to a uniform thickness.

The transfer unit 70 is positioned between the sheet tray 21 and the process unit PU. The transfer unit 70 includes a drive roller 71, a driven roller 72, a conveyer belt 73, and a plurality of transfer rollers 74. The conveyer belt 73 is an endless belt for conveying the sheet S. The drive roller 71 and the driven roller 72 are configured to drive the conveyer belt 73 to circulate. The transfer rollers 74 are positioned inside the loop of the conveyer belt 73. Each of the transfer rollers 74 is configured to nip, in cooperation with the corresponding photosensitive drum 51, the conveyer belt 73 therebetween.

The fixing device 80 includes a heating roller 81 and a pressure roller 82. The heating roller 81 is an example of a heating rotary body, and the pressure roller 82 is an example of a pressure rotary body. The heating roller 81 is rotatable about a first rotating axis A1. The heating roller 81 is configured to heat the sheet S. Two heaters 81A are disposed inside the heating roller 81. The heating roller 81 is configured to rotate by receiving a drive force from a drive source (not shown).

The pressure roller 82 is configured to nip, in cooperation with the heating roller 81, the sheet S therebetween. The pressure roller 82 is rotatable about a second rotating axis A2. The second rotating axis A2 is parallel to the first rotating axis A1. The pressure roller 82 is configured to rotate following rotation of the heating roller 81.

Each of the chargers 52 is configured to charge the surface of the corresponding photosensitive drum 51. Subsequently, the exposure device 40 is configured to expose the surfaces of the photosensitive drums 51 to light, thereby forming electrostatic latent images on the photosensitive drums 51. Each of the developing rollers 61 is configured to supply toner to the corresponding photosensitive drum 51. As a result, a toner image is formed on the surface of each of the photosensitive drums 51.

The sheet-feeding section 20 is configured to convey the sheet S to the portions between the photosensitive drums 51 and the transfer rollers 74, whereupon the toner images formed on the photosensitive drums 51 are transferred onto the sheet S. After that, the sheet S having the toner images transferred thereon is conveyed to the portion between the heating roller 81 and the pressure roller 82, whereby the transferred toner images are thermally fixed to the sheet S by the fixing device 80.

The sheet discharging section 90 includes conveying rollers 91 and a discharge roller 92. The conveying rollers 91 are configured to convey the sheet S toward the discharge roller 92. The discharge roller 92 is configured to discharge the sheet S onto the discharge tray 12.

Figure 2:
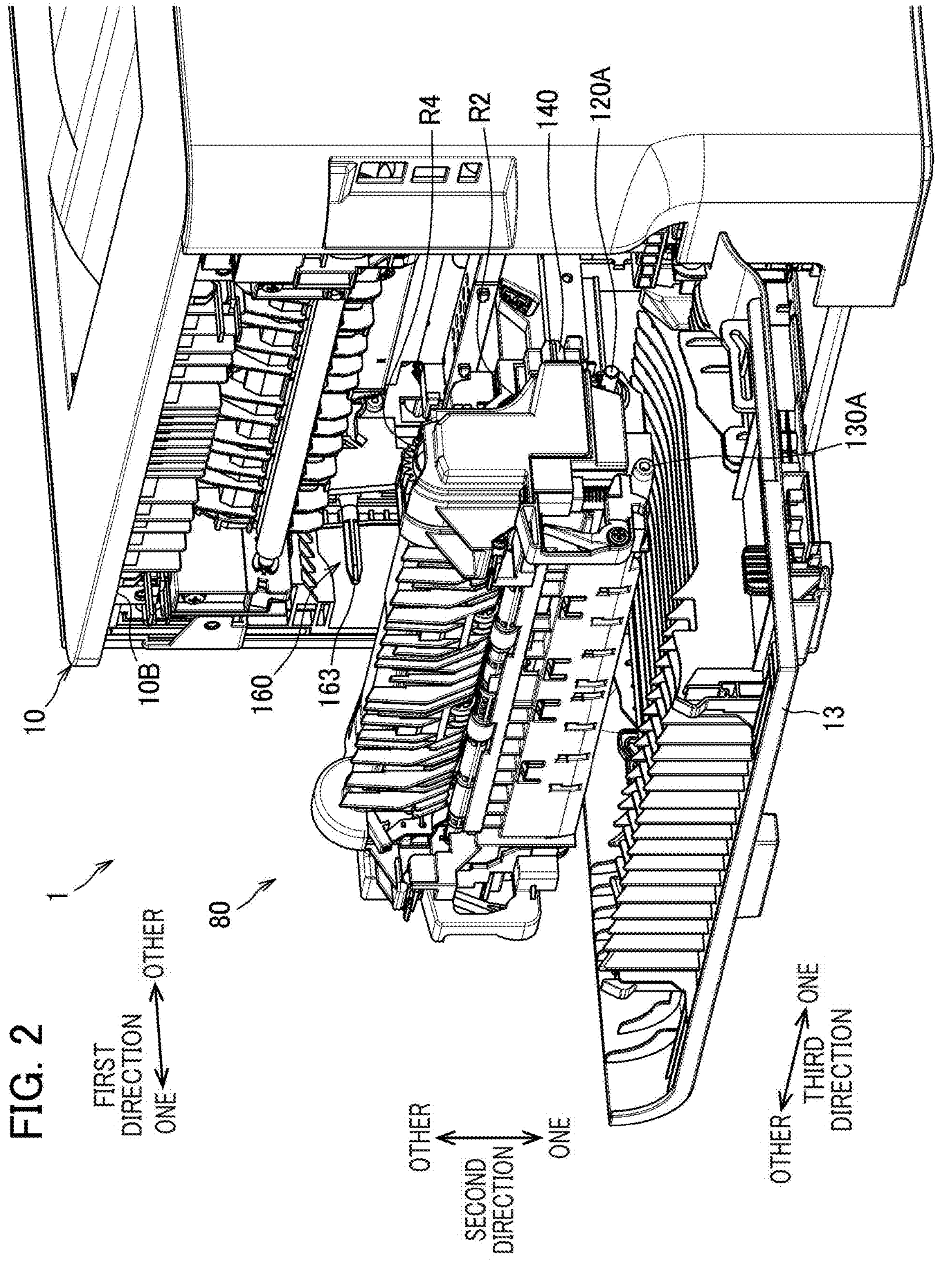
FIG. 2 is a perspective view of a fixing device and a main body casing as viewed from one side in a third direction and illustrates a state where a rear cover of the main body casing is open.

As illustrated in FIG. 2, the fixing device 80 is attachable to and detachable from the main body casing 10. Specifically, the fixing device 80 is attachable to and detachable from the main body casing 10 through an opening 10B of the main body casing 10. The opening 10B is opened by opening the rear cover 13. Hereinafter, a first direction, a second direction, and a third direction illustrated in FIG. 2 will be used when describing the directions.

The first direction is along a direction in which the fixing device 80 is attached to and detached from the main body casing 10. In the present embodiment, the first direction is along the front-rear direction of the image forming apparatus 1. Further, one side in the first direction corresponds to the rear side of the image forming apparatus 1, whereas the other side in the first direction corresponds to the front side of the image forming apparatus 1. The fixing device 80 is attachable to the main body casing 10 from the one side toward the other side in the first direction.

The second direction crosses the first direction. In the present embodiment, the second direction is orthogonal to the first direction. The second direction is along the up-down direction of the image forming apparatus 1. Further, one side in the second direction corresponds to the lower side of the image forming apparatus 1, whereas the other side in the second direction corresponds to the upper side of the image forming apparatus 1.

The third direction is orthogonal to both the first direction and the second direction. In the present embodiment, the third direction is along the left-right direction of the image forming apparatus 1. Further, one side in the third direction corresponds to the left side of the image forming apparatus 1, whereas the other side in the third direction corresponds to the right side of the image forming apparatus 1. The third direction is parallel to the first rotating axis A1.

Figure 3:
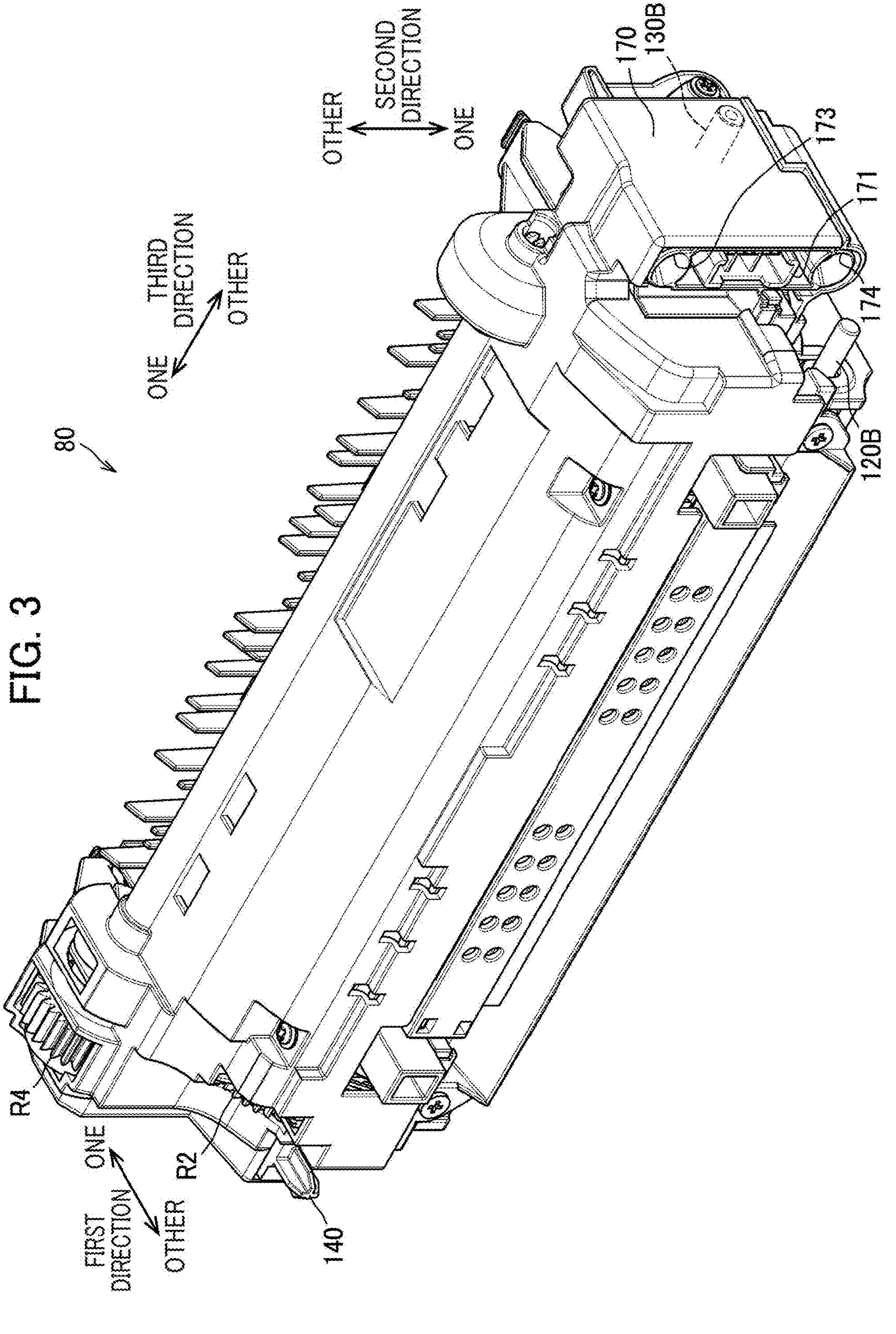
FIG. 3 is a perspective view of the fixing device as viewed from the other side in the third direction.

As illustrated in FIGS. 2 and 3, the fixing device 80 further includes a first boss 120A, a second boss 130A, a third boss 120B, a fourth boss 130B, a protruding part 140, and a unit connector 170. The image forming apparatus 1 further includes a main body connector 160.

The first boss 120A and the third boss 120B are configured to contact the main body casing 10 in a state where the fixing device 80 is attached to the main body casing 10. With this configuration, the first boss 120A and the third boss 120B are configured to be fixed in position relative to the main body casing 10 both in the first direction and in the second direction. The second boss 130A and the fourth boss 130B are configured to contact the main body casing 10 in the state where the fixing device 80 is attached to the main body casing 10. With this configuration, the fixing device 80 is restricted from rotating about the first boss 120A and the third boss 120B.

The first boss 120A has a columnar shape. The second boss 130A has a columnar shape. The second boss 130A is positioned further toward the one side in the first direction than the first boss 120A. The second boss 130A is positioned further toward the one side in the second direction than the first boss 120A. The first boss 120A and the second boss 130A extend in the third direction. The first boss 120A and the second boss 130A are positioned at an end portion of the fixing device 80 on the one side in the third direction. The first boss 120A and the second boss 130A protrude toward the one side in the third direction from a surface of the fixing device 80 on the one side in the third direction.

The third boss 120B has a structure that is symmetrical to the first boss 120A in the third direction. The fourth boss 130B has a structure that is symmetrical to the second boss 130A in the third direction. The third boss 120B and the fourth boss 130B are positioned at an end portion of the fixing device 80 on the other side in the third direction. The third boss 120B and the fourth boss 130B protrude toward the other side in the third direction from a surface of the fixing device 80 on the other side in the third direction.

The protruding part 140 is positioned at a surface of the fixing device 80 on the other side in the first direction. The protruding part 140 is disposed at the end portion of the fixing device 80 on the one side in the third direction, and protrudes toward the other side in the first direction. A cross-section of the protruding part 140 orthogonal to the first direction has a cross shape. The protruding part 140 has a base part on the one side in the first direction and a tip end part on the other side in the first direction. The tip end part of the protruding part 140 is thinner than the base part of the protruding part 140.

The unit connector 170 is configured to be connected to the main body connector 160 in the state where the fixing device 80 is attached to the main body casing 10. The unit connector 170 is positioned at the end portion of the fixing device 80 on the other side in the third direction. The main body connector 160 is a floating connector held by the main body casing 10 so as to be movable relative to the main body casing 10. When the main body connector 160 is connected to the unit connector 170, electric power can be supplied to the heaters 81A of the heating roller 81.

Figure 10A:
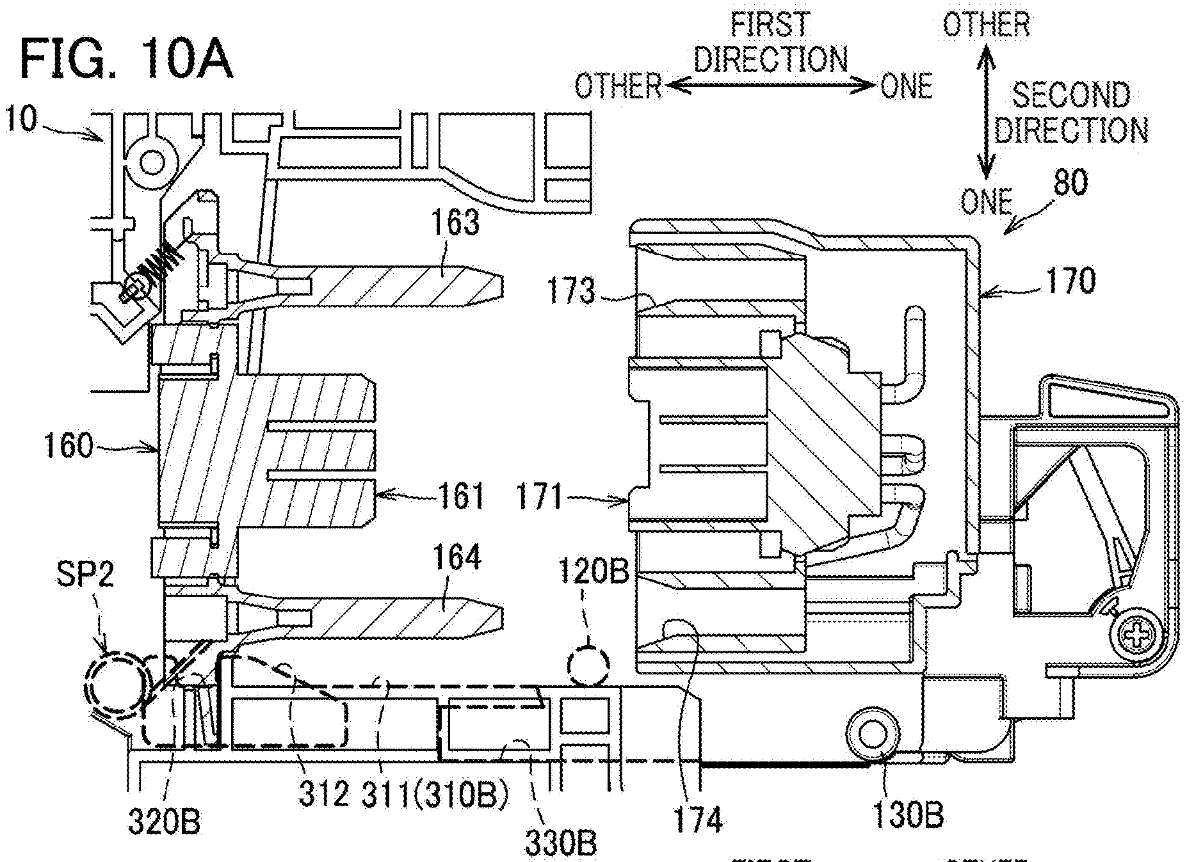
FIG. 10A is a view illustrating the other side portion of the fixing device in the third direction during the attachment of the fixing device to the main body casing, and particularly illustrates a state before a unit connector is connected to a main body connector.

As illustrated in FIG. 10A, the main body connector 160 includes a main body housing 161, a first guide pin 163, and a second guide pin 164.

The main body housing 161 holds terminals. The main body housing 161 is positioned between the first guide pin 163 and the second guide pin 164 in the second direction. The first guide pin 163 and the second guide pin 164 extend in the first direction. The tip end of each of the first guide pin 163 and the second guide pin 164 is positioned further toward the one side in the first direction than the main body housing 161.

The unit connector 170 includes a unit housing 171, and has a first guide hole 173 and a second guide hole 174.

The unit housing 171 holds terminals. The unit housing 171 is configured to be fitted to the main body housing 161. When the unit housing 171 is fitted to the main body housing 161, each terminal of the unit connector 170 is electrically connected to the corresponding terminal of the main body connector 160. The unit housing 171 is positioned between the first guide hole 173 and the second guide hole 174 in the second direction.

The first guide hole 173 is a hole for receiving the first guide pin 163. The second guide hole 174 is a hole for receiving the second guide pin 164. The unit housing 171, the first guide hole 173, and the second guide hole 174 open toward the other side in the first direction.

Figure 4A:
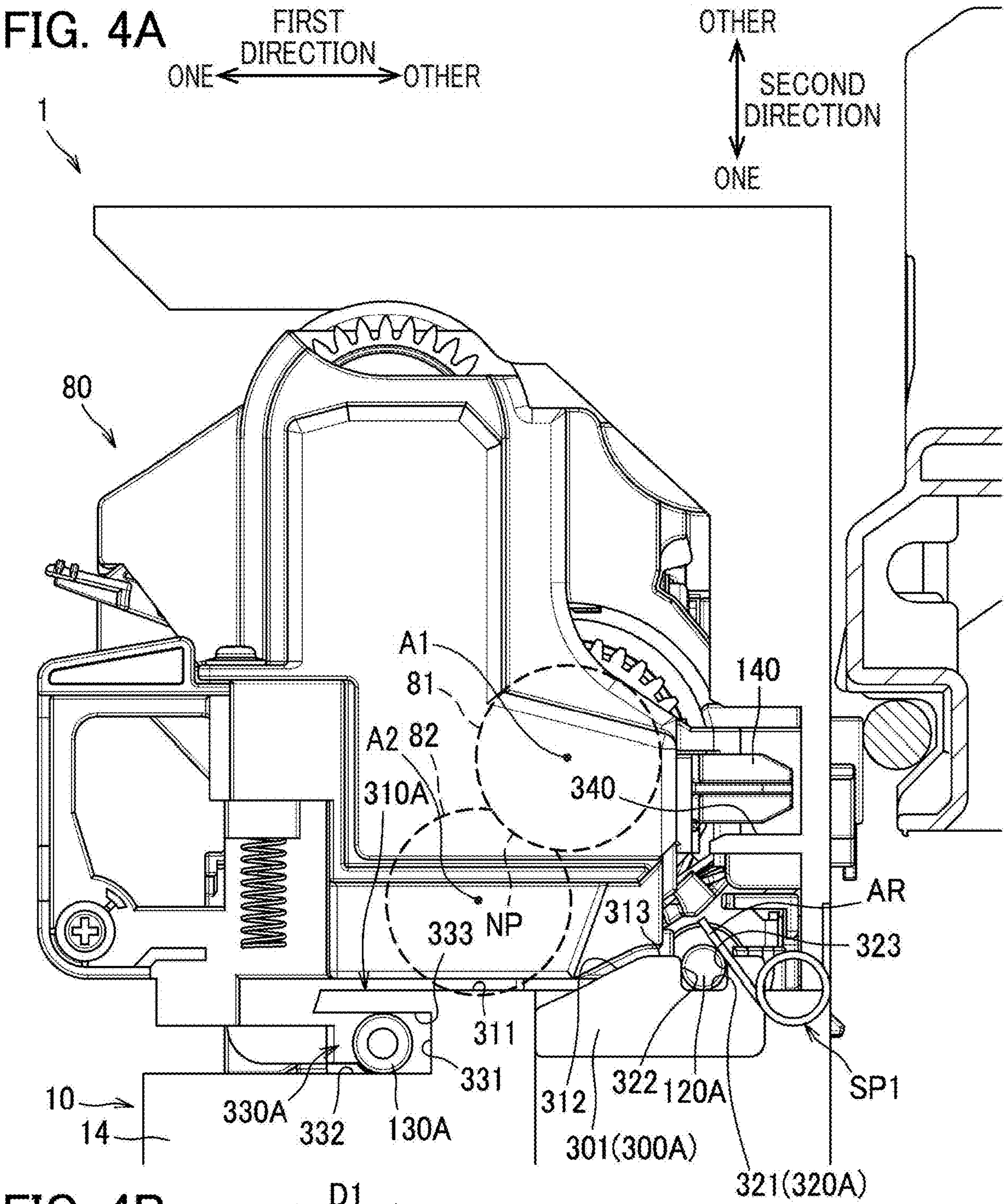
FIG. 4A is a view illustrating a one side guide surface, a first recessed portion, a second recessed portion, and a first spring of the main body casing, and the fixing device.

As illustrated in FIG. 4A, the main body casing 10 has a one side guide surface 310A, a first recessed portion 320A, and a second recessed portion 330A. The one side guide surface 310A, the first recessed portion 320A, and the second recessed portion 330A are positioned at an end portion of the main body casing 10 on the one side in the third direction. The one side guide surface 310A is an example of the guide surface.

The first recessed portion 320A is recessed toward the one side in the second direction. The first boss 120A of the fixing device 80 is positioned (inserted) in the first recessed portion 320A in the state where the fixing device 80 is attached to the main body casing 10. In this state, the first boss 120A is positioned further toward the other side in the first direction than a nip position NP between the heating roller 81 and the pressure roller 82. The nip position NP is a position in which the heating roller 81 and the pressure roller 82 nip the sheet S. The main body casing 10 includes a first metal plate 300A. The first metal plate 300A has a first portion 301. The first portion 301 is orthogonal to the third direction. The first recessed portion 320A is formed in the first portion 301 of the first metal plate 300A. The first metal plate 300A is an example of the metal plate.

The first recessed portion 320A has a first reference surface 321, a second reference surface 322, and a stopper surface 323. The first reference surface 321 is a surface of the first recessed portion 320A on the one side in the second direction. In the present embodiment, the first reference surface 321 is an end surface of the first recessed portion 320A on the one side in the second direction. The first reference surface 321 is orthogonal to the second direction.

The second reference surface 322 is a surface of the first recessed portion 320A on the one side in the first direction. In the present embodiment, the second reference surface 322 is an end surface of the first recessed portion 320A on the one side in the first direction. The second reference surface 322 extends toward the other side in the second direction from the end of the first reference surface 321 on the one side in the first direction. The second reference surface 322 crosses the first direction. In the present embodiment, the second reference surface 322 is orthogonal to the first direction.

The stopper surface 323 is a surface of the first recessed portion 320A on the other side in the first direction. In the present embodiment, the stopper surface 323 is an end surface of the first recessed portion 320A on the other side in the first direction. The stopper surface 323 extends toward the other side in the second direction from the end of the first reference surface 321 on the other side in the first direction.

The stopper surface 323 crosses the first direction. In the present embodiment, the stopper surface 323 is orthogonal to the first direction. When the first boss 120A of the fixing device 80 being attached to the main body casing 10 contacts the stopper surface 323, the stopper surface 323 suppresses further movement of the fixing device 80 toward the other side in the first direction.

Figure 4B:
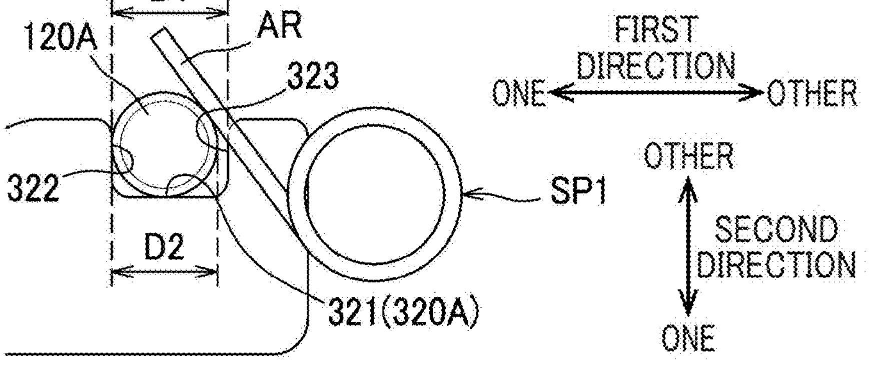
FIG. 4B is an enlarged view of the periphery of a first boss.

As illustrated in FIG. 4B, a distance D1 between the second reference surface 322 and the stopper surface 323 of the first recessed portion 320A is greater than the dimension of the first boss 120A in a direction orthogonal to the third direction. In the present embodiment, the distance D1 is the distance in the first direction between the second reference surface 322 and the stopper surface 323. Specifically, the distance D1 between the second reference surface 322 and the stopper surface 323 of the first recessed portion 320A is greater than a diameter D2 of the first boss 120A.

As illustrated in FIG. 4A, the one side guide surface 310A is configured to guide the first boss 120A toward the first recessed portion 320A during attachment of the fixing device 80 to the main body casing 10. The one side guide surface 310A has a first guide surface 311, a second guide surface 312, and a third guide surface 313.

The first guide surface 311 extends in the first direction. The first guide surface 311 is provided at a first side frame 14. The first side frame 14 is positioned at the end portion of the main body casing 10 on the one side in the third direction.

The second guide surface 312 and the third guide surface 313 are formed at the first portion 301 of the first metal plate 300A. The second guide surface 312 is positioned between the first guide surface 311 and the first recessed portion 320A. Specifically, the second guide surface 312 is positioned between the first guide surface 311 and the third guide surface 313. The second guide surface 312 is inclined so as to approach the other side in the second direction as extending from the one side toward the other side in the first direction. In other words, the second guide surface 312 is inclined in a direction diagonally upward and frontward.

The third guide surface 313 is positioned between the second guide surface 312 and the first recessed portion 320A. The third guide surface 313 extends toward the other side in the first direction from the end of the second guide surface 312 on the other side in the first direction. The end of the third guide surface 313 on the other side in the first direction is connected to the end of the second reference surface 322 on the other side in the second direction.

The second recessed portion 330A is recessed toward the other side in the first direction. The second recessed portion 330A is formed at the first side frame 14 of the main body casing 10. The second boss 130A is inserted in the second recessed portion 330A in the state where the fixing device 80 is attached to the main body casing 10. The second boss 130A is positioned further toward the one side in the first direction than the nip position NP between the heating roller 81 and the pressure roller 82. The second recessed portion 330A opens toward the one side in the first direction. The second recessed portion 330A has a bottom surface 331, a first restriction surface 332, and a second restriction surface 333.

The bottom surface 331 is a surface of the second recessed portion 330A on the other side in the first direction. In the present embodiment, the bottom surface 331 is an end surface of the second recessed portion 330A on the other side in the first direction. The first restriction surface 332 and the second restriction surface 333 are surfaces for restricting the fixing device 80 from rotating about the first boss 120A. The first restriction surface 332 extends toward the one side in the first direction from the end of the bottom surface 331 on the one side in the second direction. The second restriction surface 333 extends toward the one side in the first direction from the end of the bottom surface 331 on the other side in the second direction. The second boss 130A inserted in the second recessed portion 330A is positioned between the first restriction surface 332 and the second restriction surface 333.

The image forming apparatus 1 further includes a first spring SP1. For example, the first spring SP1 is a torsion coil spring. The first spring SP1 includes a pressing arm AR. In the state where the fixing device 80 is attached to the main body casing 10, the pressing arm AR of the first spring SP1 presses the first boss 120A positioned (inserted) in the first recessed portion 320A toward both the one side in the first direction and the one side in the second direction. The first spring SP1 is an example of the spring.

The first boss 120A is in contact with both the first reference surface 321 and the second reference surface 322 of the first recessed portion 320A in a state where the first boss 120A is pressed by the first spring SP1. However, the first boss 120A is not in contact with the stopper surface 323 of the first recessed portion 320A in the state where the first boss 120A is pressed by the first spring SP1. In other words, a gap is formed between the first boss 120A and the stopper surface 323 in the state where the first boss 120A is pressed by the first spring SP1. More specifically, in the state where the first boss 120A is pressed by the first spring SP1, a gap is formed between the end of the first boss 120A on the other side in the first direction and the stopper surface 323.

Figure 11A:
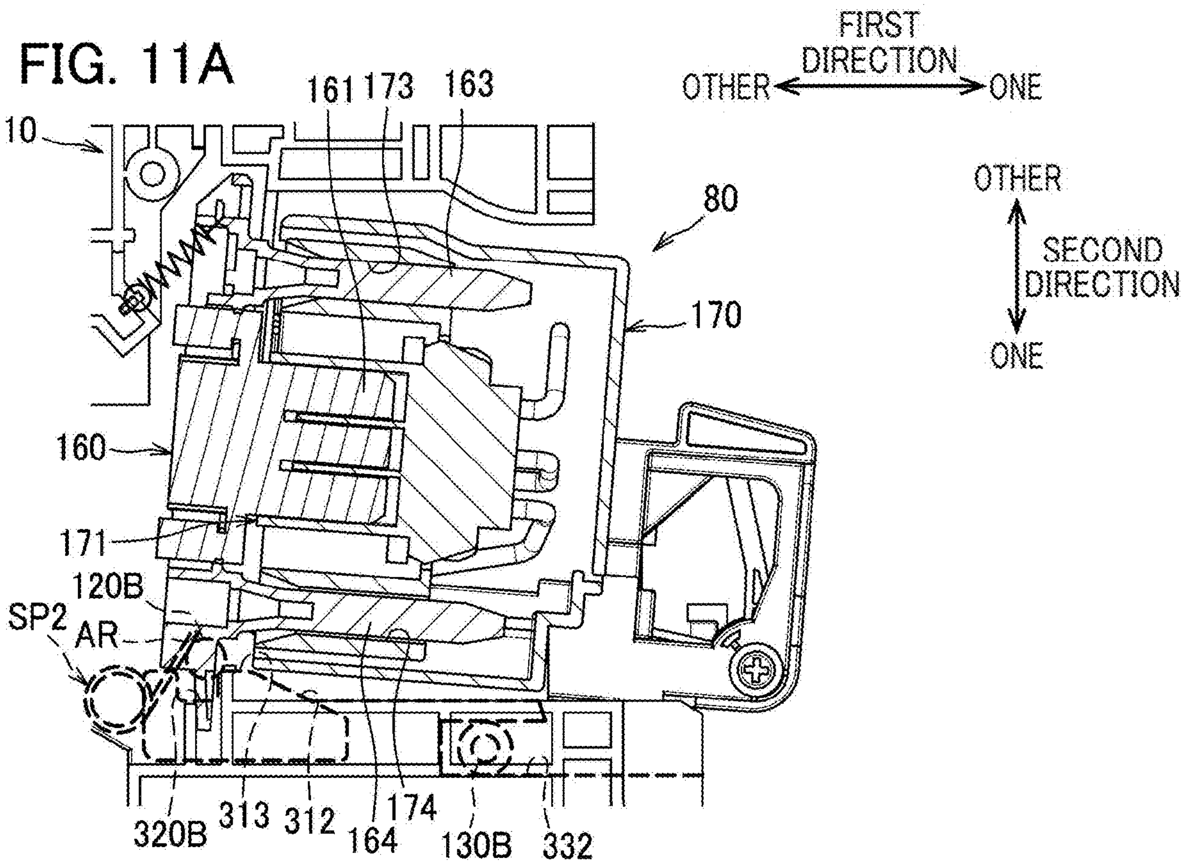
FIG. 11A is a view illustrating the other side portion of the fixing device in the third direction during the attachment of the fixing device to the main body casing, and particularly illustrates a state where the third boss has come off an other side guide surface.
Figure 11B:
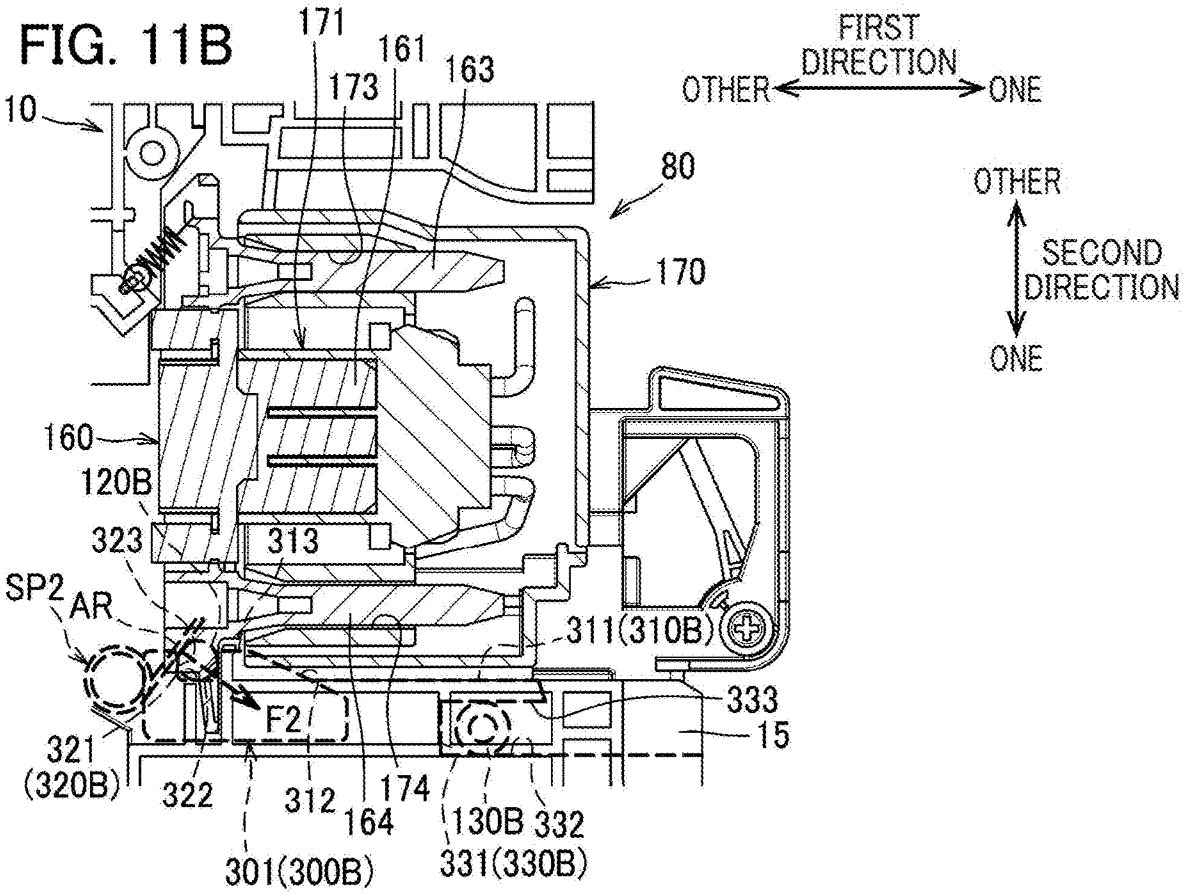
FIG. 11B is a view illustrating the other side portion of the fixing device in the third direction during the attachment of the fixing device to the main body casing, and particularly illustrates a state where the third boss has been inserted in a third recessed portion.

As illustrated in FIG. 11B, the main body casing 10 further has an other side guide surface 310B, a third recessed portion 320B, and a fourth recessed portion 330B. The other side guide surface 310B, the third recessed portion 320B, and the fourth recessed portion 330B are positioned at an end portion of the main body casing 10 on the other side in the third direction. In the present embodiment, the third recessed portion 320B has a structure that is symmetrical to the first recessed portion 320A in the third direction, the other side guide surface 310B has a structure that is symmetrical to the one side guide surface 310A in the third direction, and the fourth recessed portion 330B has a structure that is symmetrical to the second recessed portion 330A in the third direction. Therefore, in the following description, the parts that have the same functions are designated with the same reference numerals to avoid duplicating description.

The third boss 120B of the fixing device 80 is positioned (inserted) in the third recessed portion 320B in the state where the fixing device 80 is attached to the main body casing 10. The main body casing 10 further includes a second metal plate 300B. In the present embodiment, the second metal plate 300B has a structure that is symmetrical to the first metal plate 300A in the third direction. The third recessed portion 320B is formed in the first portion 301 of the second metal plate 300B. When the third boss 120B of the fixing device 80 being attached to the main body casing 10 contacts the stopper surface 323 of the third recessed portion 320B, the stopper surface 323 of the third recessed portion 320B suppresses further movement of the fixing device 80 toward the other side in the first direction.

The other side guide surface 310B is configured to guide the third boss 120B toward the third recessed portion 320B during attachment of the fixing device 80 to the main body casing 10. The first guide surface 311 of the other side guide surface 310B is formed at a second side frame 15. The second side frame 15 is positioned at the end portion of the main body casing 10 on the other side in the third direction. The second guide surface 312 and third guide surface 313 of the other side guide surface 310B are formed at the first portion 301 of the second metal plate 300B.

The fourth recessed portion 330B is formed at the second side frame 15 of the main body casing 10. The fourth boss 130B is inserted in the fourth recessed portion 330B in the state where the fixing device 80 is attached to the main body casing 10. The first restriction surface 332 and second restriction surface 333 of the fourth recessed portion 330B are surfaces for restricting the fixing device 80 from rotating about the third boss 120B. The fourth boss 130B inserted in the fourth recessed portion 330B is positioned between the first restriction surface 332 and the second restriction surface 333 of the fourth recessed portion 330B.

The image forming apparatus 1 further includes a second spring SP2. For example, the second spring SP2 is a torsion coil spring. In the state where the fixing device 80 is attached to the main body casing 10, the pressing arm AR of the second spring SP2 presses the third boss 120B positioned (inserted) in the third recessed portion 320B toward both the one side in the first direction and the one side in the second direction.

The third boss 120B is in contact with the first reference surface 321 and second reference surface 322 of the third recessed portion 320B in a state where the third boss 120B is pressed by the second spring SP2. However, the third boss 120B is not in contact with the stopper surface 323 of the third recessed portion 320B in the state where the third boss 120B is pressed by the second spring SP2.

Figure 5:
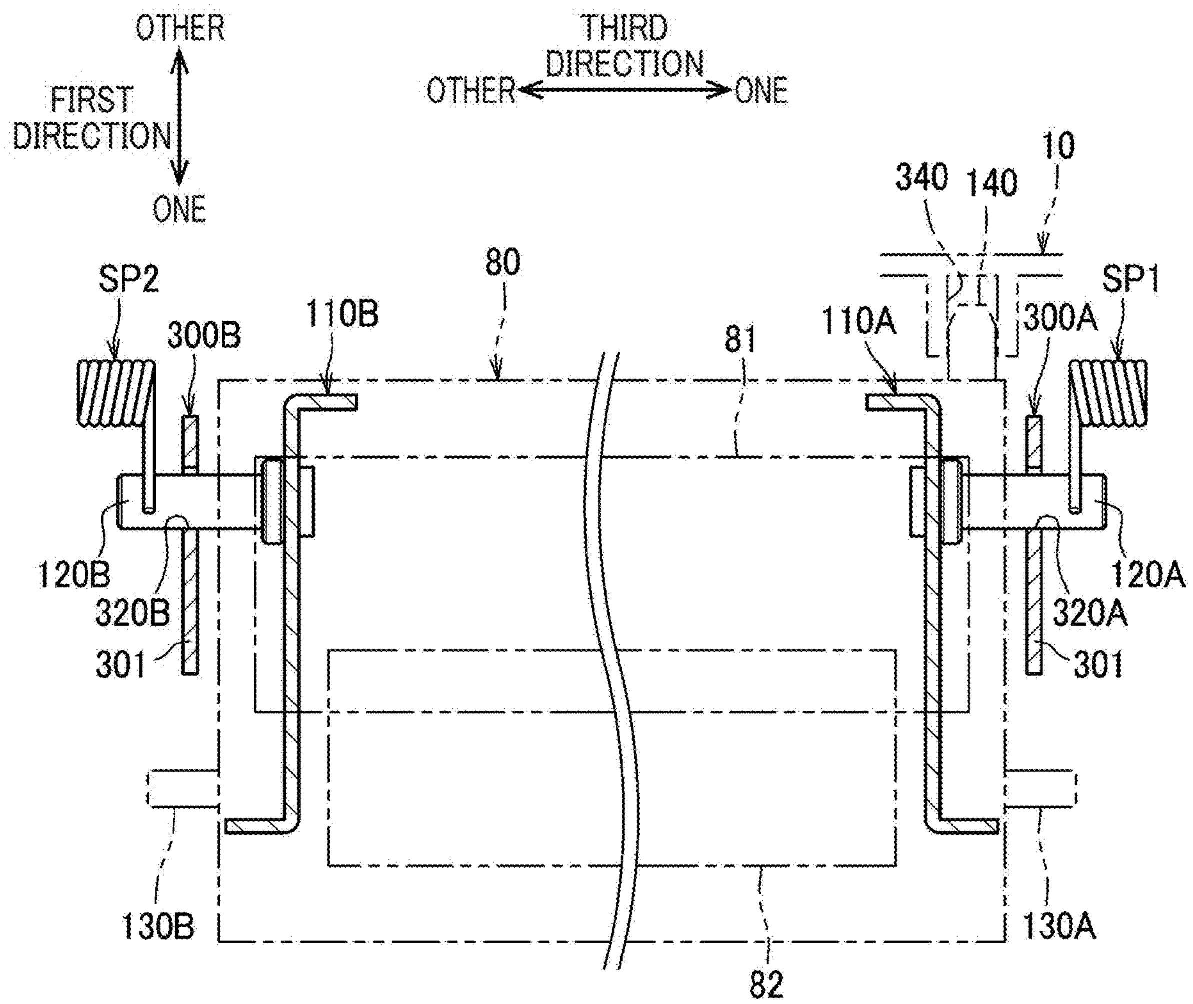
FIG. 5 is a view illustrating side plates and bosses of the fixing device, and metal plates and springs of the main body casing.

As illustrated in FIGS. 4A and 5, the main body casing 10 has an elongated hole 340. The elongated hole 340 is a hole that is elongated in the second direction with a closed bottom. The elongated hole 340 has a shape recessed toward the other side in the first direction. The elongated hole 340 opens toward the one side in the first direction. The protruding part 140 is inserted in the elongated hole 340 in the state where the fixing device 80 is attached to the main body casing 10. The position of the fixing device 80 in the third direction relative to the main body casing 10 is fixed by insertion of the protruding part 140 in the elongated hole 340. The elongated hole 340 is an example of the hole.

The dimension of the elongated hole 340 in the third direction is approximately the same as the dimension of the protruding part 140 in the third direction. The protruding part 140 is configured to be fitted to the elongated hole 340 in the first direction. The elongated hole 340 is configured to restrict the protruding part 140 from moving in the third direction. With this configuration, the elongated hole 340 is configured to restrict the fixing device 80 from moving in the third direction. The dimension of the elongated hole 340 in the second direction is greater than the dimension of the protruding part 140 in the second direction.

As illustrated in FIG. 5, the fixing device 80 further includes a first side plate 110A and a second side plate 110B. The first side plate 110A and the second side plate 110B support the heating roller 81. Each of the first side plate 110A and the second side plate 110B has a through-hole 111 (see FIG. 6) for supporting the heating roller 81. The through-hole 111 has a circular shape. The first side plate 110A is an example of the side plate.

Each of the first side plate 110A and the second side plate 110B is configured of a metal plate. The first side plate 110A is positioned at an end portion of the heating roller 81 on the one side in the third direction. The first side plate 110A is positioned further toward the one side in the third direction than the pressure roller 82. The second side plate 110B is positioned at an end portion of the heating roller 81 on the other side in the third direction. The second side plate 110B is positioned further toward the other side in the third direction than the pressure roller 82. The first side plate 110A has a part orthogonal to the third direction. The protruding part 140 is positioned further toward the one side in the third direction than the part of the first side plate 110A orthogonal to the third direction.

Figure 6:
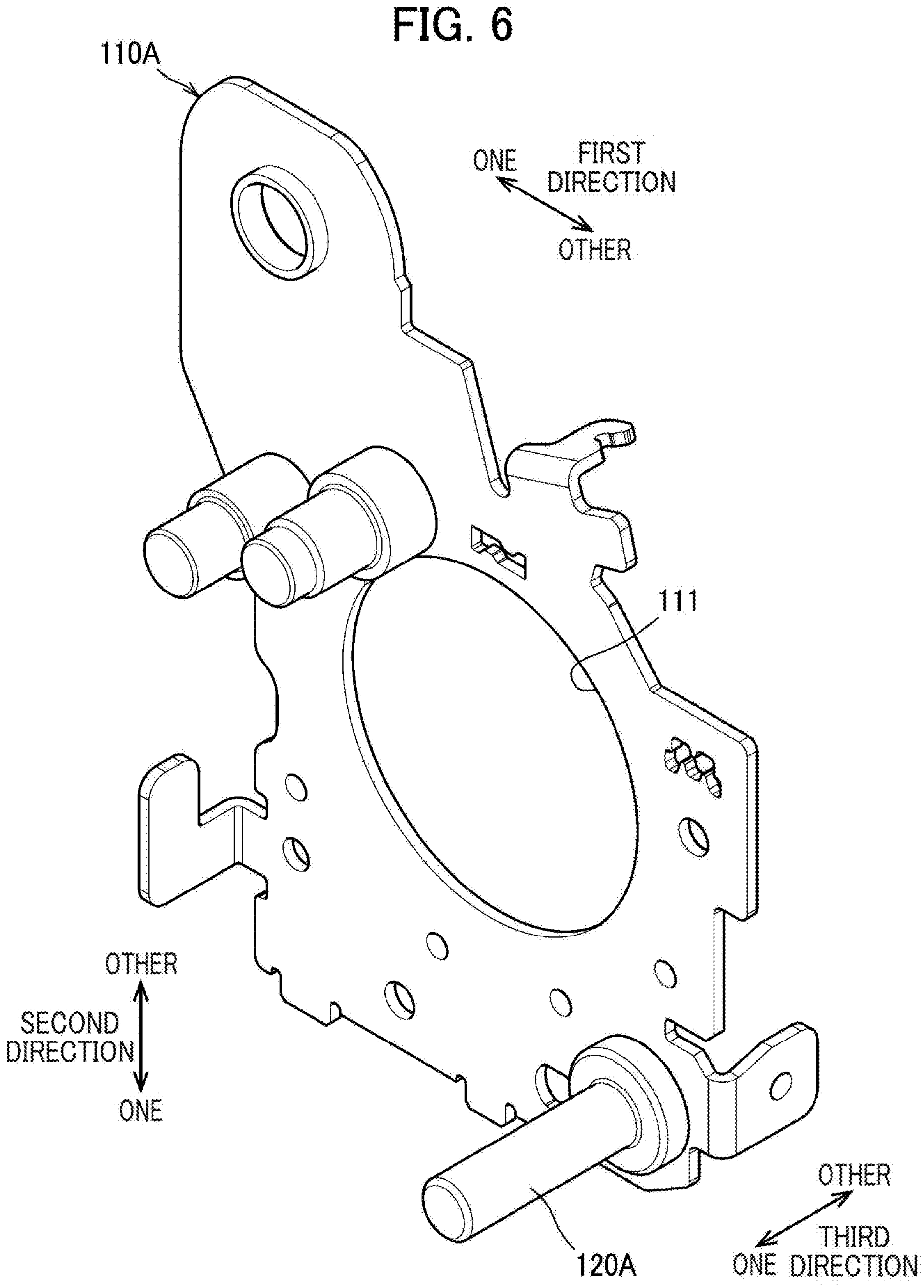
FIG. 6 is a perspective view of the first boss and a first side plate.

As illustrated in FIGS. 5 and 6, each of the first boss 120A and the third boss 120B is configured of a metal rod. The end portion of the first boss 120A on the other side in the third direction is fixed to the first side plate 110A by caulking (by riveting). The end portion of the third boss 120B on the one side in the third direction is fixed to the second side plate 110B by caulking (by riveting). Note that the first boss 120A and the first side plate 110A are illustrated as representative examples in FIG. 6.

As illustrated in FIG. 5, the first metal plate 300A of the main body casing 10 is positioned further toward the one side in the third direction than the first side plate 110A in the state where the fixing device 80 is attached to the main body casing 10. The first spring SP1 presses the first boss 120A at a position further toward the one side in the third direction than the first metal plate 300A. Specifically, the first spring SP1 presses a tip portion of the first boss 120A, rather than a portion of the first boss 120A between the first metal plate 300A and the first side plate 110A. The tip portion of the first boss 120A is farther from the first side plate 110A than the first metal plate 300A is from the first side plate 110A. In other words, the first spring SP1 presses a portion of the first boss 120A that is positioned on the opposite side of the first metal plate 300A from the first side plate 110A in the third direction.

Further, the second metal plate 300B of the main body casing 10 is positioned further toward the other side in the third direction than the second side plate 110B in the state where the fixing device 80 is attached to the main body casing 10. The second spring SP2 presses the third boss 120B at a position further toward the other side in the third direction than the second metal plate 300B. Specifically, the second spring SP2 presses a tip portion of the third boss 120B, rather than a portion of the third boss 120B between the second metal plate 300B and the second side plate 110B. The tip portion of the second spring SP2 is farther from the second side plate 110B than the second metal plate 300B is from the second side plate 110B. In other words, the second spring SP2 presses a portion of the third boss 120B that is positioned on the opposite side of the second metal plate 300B from the second side plate 110B in the third direction.

Figure 7:
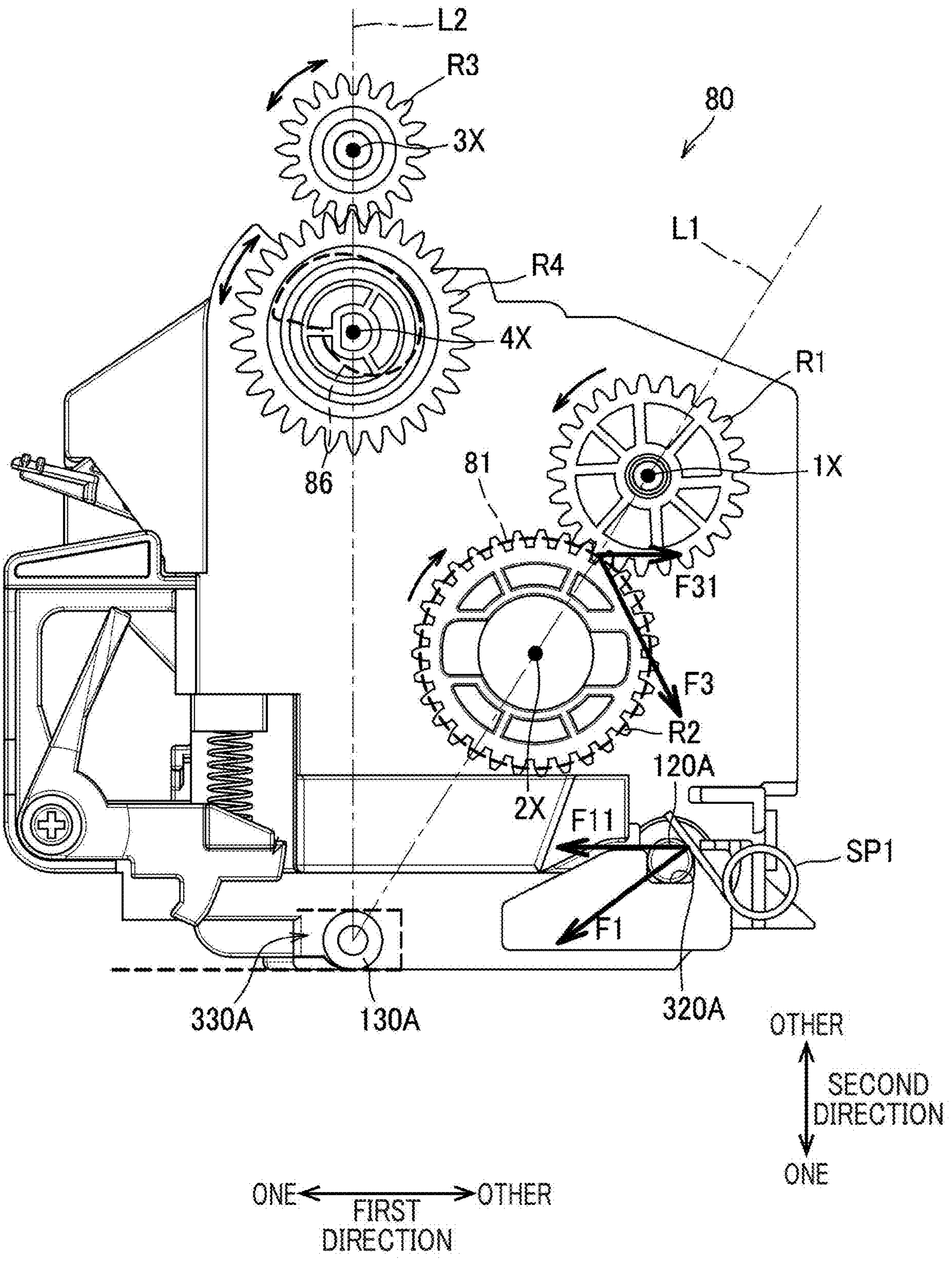
FIG. 7 is a view for explaining a force applied from the first spring to the first boss and a force applied from a first drive gear of the main body casing to a first input gear of the fixing device.

As illustrated in FIG. 7, the image forming apparatus 1 further includes a first drive gear R1 and a second drive gear R3. The fixing device 80 further includes a first input gear R2 and a second input gear R4.

The first drive gear R1 and the second drive gear R3 are supported by the main body casing 10. The first drive gear R1 is rotatable about a first axis 1X extending in the third direction. The second drive gear R3 is rotatable about a third axis 3X extending in the third direction.

The first input gear R2 and the second input gear R4 are positioned at the end portion of the fixing device 80 on the one side in the third direction. The first input gear R2 is rotatable about a second axis 2X extending in the third direction. The first input gear R2 is in meshing engagement with the first drive gear R1 in the state where the fixing device 80 is attached to the main body casing 10. As illustrated in FIG. 7, when the first drive gear R1 rotates counterclockwise in FIG. 7 by receiving a drive force from the drive source (not shown), the first input gear R2 rotates clockwise. With this configuration, the heating roller 81 rotates clockwise, and the pressure roller 82 rotates following the rotation of the heating roller 81.

The first input gear R2 is disposed further toward the other side in the third direction than the protruding part 140 (see FIG. 3). In other words, the protruding part 140 is provided further toward the one side in the third direction than the first input gear R2.

The second input gear R4 is rotatable about a fourth axis 4X extending in the third direction. The second input gear R4 is in meshing engagement with the second drive gear R3 in the state where the fixing device 80 is attached to the main body casing 10. The fixing device 80 further includes a cam 86. The cam 86 is rotatable about the fourth axis 4X. The cam 86 is configured to change the nipping pressure applied when nipping the sheet S. Specifically, rotation of the cam 86 moves at least one of the heating roller 81 and the pressure roller 82 to thereby change the nipping pressure. Note that, the present disclosure includes the phrases "at least one of A and B", "at least one of A, B and C", "at least one of A, B, C and D", and the like as alternative expressions that mean one or more of A and B, one or more of A, B and C, one or more of A, B, C and D, and the like, respectively. For example, the phrase "at least one of A and B" means (A), (B) or (A and B), and the phrase "at least one of A, B and C" means (A), (B), (C), (A and B), (A and C), (B and C) or (A, B and C).

When the second drive gear R3 rotates counterclockwise by receiving a drive force, the second input gear R4 rotates clockwise, so that the cam 86 rotates clockwise. When the second drive gear R3 rotates clockwise by receiving the drive force, the second input gear R4 rotates counterclockwise, so that the cam 86 rotates counterclockwise.

In the present embodiment, the second boss 130A is positioned on a straight line L1 as viewed in the third direction. The straight line L1 passes through the first axis 1X and the second axis 2X. Further, the second boss 130A is positioned on a straight line L2 as viewed in the third direction. The straight line L2 passes through the third axis 3X and the fourth axis 4X. The first axis 1X and the second axis 2X are positioned further toward the other side in the first direction than the straight line L2.

The first boss 120A is positioned further toward the other side in the first direction than the second axis 2X. The first boss 120A is positioned further toward the one side in the second direction than the second axis 2X. The first input gear R2 is in meshing engagement with the first drive gear R1 at a position further toward the other side in the first direction than the second axis 2X. In other words, the meshing engagement point between the first drive gear R1 and the first input gear R2 is located further toward the other side in the first direction than the second axis 2X. Further, the first input gear R2 is in meshing engagement with the first drive gear R1 at a position further toward the other side in the second direction than the second axis 2X. In other words, the meshing engagement point between the first drive gear R1 and the first input gear R2 is located further toward the other side in the second direction than the second axis 2X.

While the first drive gear R1 rotates counterclockwise by receiving the drive force, the first drive gear R1 presses, with a force F3, the first input gear R2 toward both the other side in the first direction and the one side in the second direction. The first spring SP1 presses, with a force F1, the first boss 120A positioned (inserted) in the first recessed portion 320A toward both the one side in the first direction and the one side in the second direction. The force F1, with which the first spring SP1 presses the first boss 120A, has a force component F11 in the first direction. The force F3, with which the first drive gear R1 presses the first input gear R2, has a force component F31 in the first direction. The force component F11 is greater than the force component F31.

Note that the end portion of the fixing device 80 on the other side in the third direction does not receive a force from the gears supported by the main body casing 10. Accordingly, in the present embodiment, a force F2, with which the second spring SP2 (see FIG. 11B) presses the third boss 120B inserted in the third recessed portion 320B, is smaller than the force F1, with which the first spring SP1 presses the first boss 120A positioned in the first recessed portion 320A. The urging force of the second spring SP2 is smaller than the urging force of the first spring SP1.

Next, the operation of each part or component when attaching the fixing device 80 to the main body casing 10 will be described.

Figure 8A:
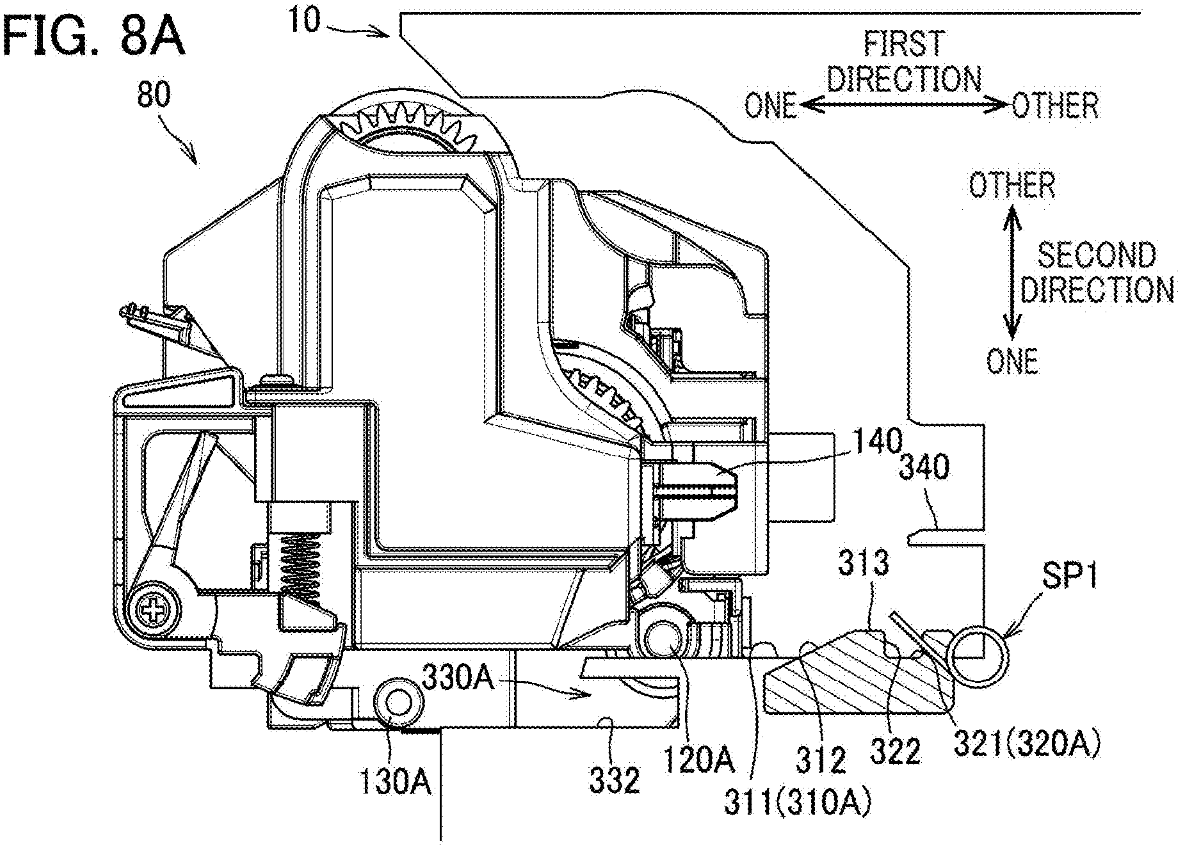
FIG. 8A is a view illustrating one side portion of the fixing device in the third direction during attachment of the fixing device to the main body casing, and particularly illustrates a state where the first boss is guided by a first guide surface.

As illustrated in FIG. 8A, by inserting the fixing device 80 into the main body casing 10 in the first direction from the one side toward the other side, the first boss 120A comes into contact with the first guide surface 311 of the one side guide surface 310A and is guided by the first guide surface 311 in the end portion of the fixing device 80 on the one side in the third direction.

Figure 8B:
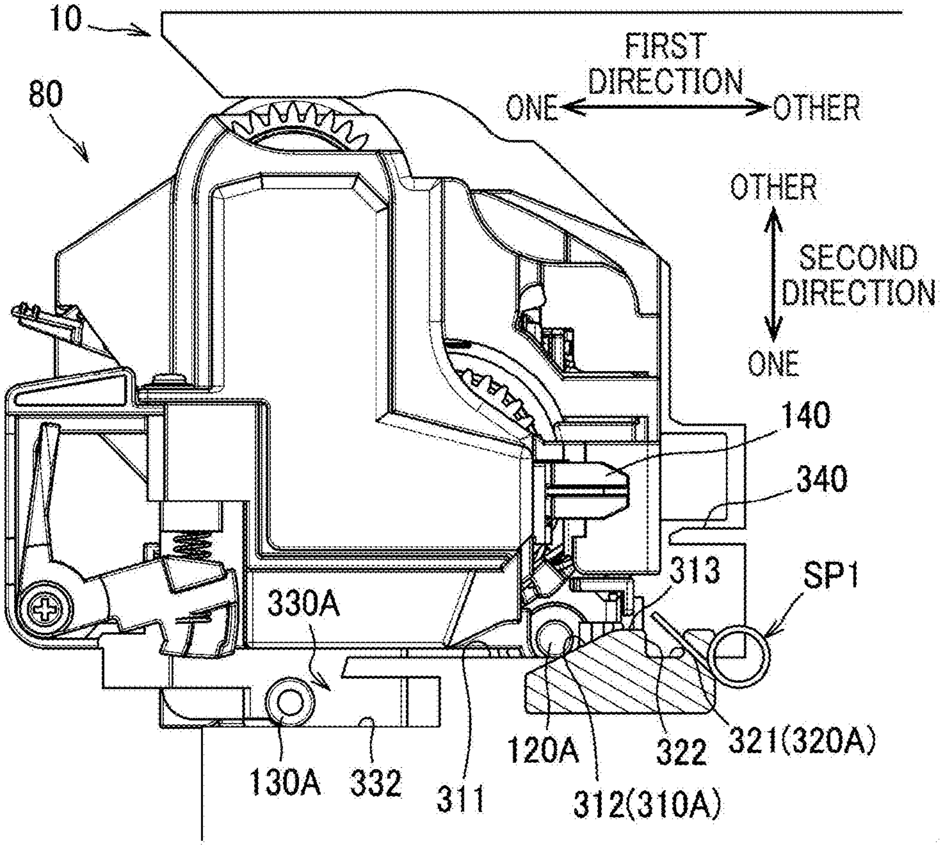
FIG. 8B is a view illustrating the one side portion of the fixing device in the third direction during the attachment of the fixing device to the main body casing, and particularly illustrates a state where the first boss has arrived at a second guide surface.

Further, as illustrated in FIG. 8B, the second boss 130A comes into contact with the first restriction surface 332 of the second recessed portion 330A and is guided by the first restriction surface 332. When the first boss 120A comes into contact with the second guide surface 312, the first boss 120A is guided by the second guide surface 312 to move toward both the other side in the first direction and the other side in the second direction (i.e., to move in a direction diagonally upward and frontward).

Figure 9A:
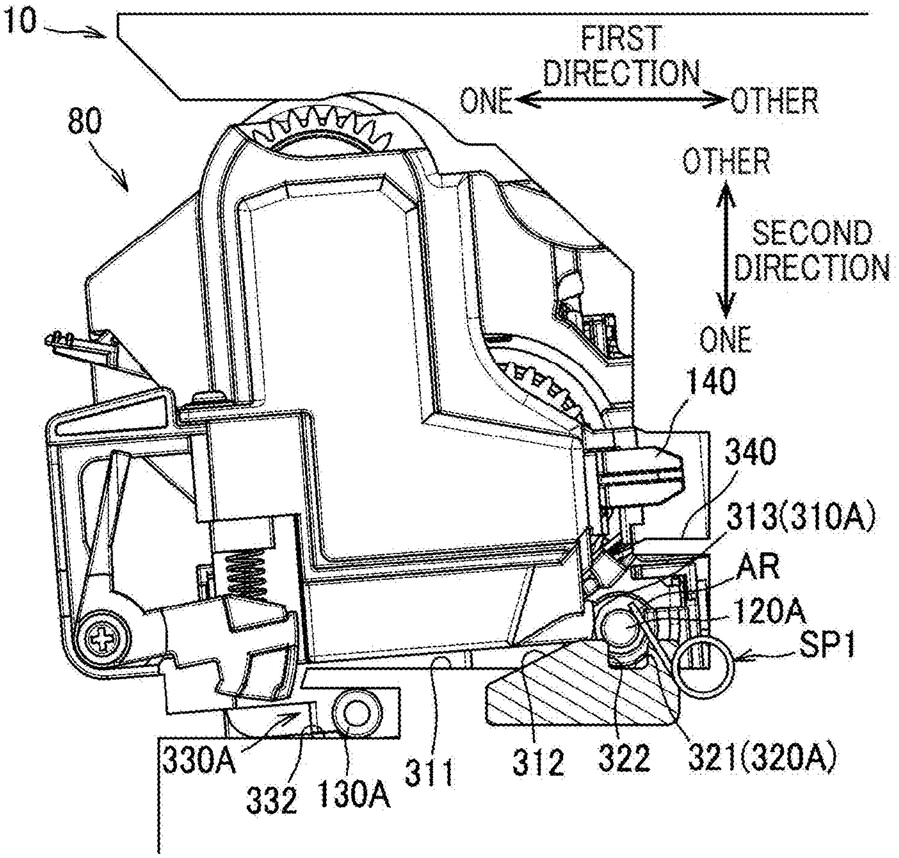
FIG. 9A is a view illustrating the one side portion of the fixing device in the third direction during the attachment of the fixing device to the main body casing, and particularly illustrates a state where the first boss has come off a third guide surface.

With this configuration, as illustrated in FIG. 9A, the fixing device 80 is inserted into the main body casing 10 in such a posture that the surface of the fixing device 80 on the other side in the first direction faces both the other side in the first direction and the other side in the second direction (i.e., faces in a direction diagonally upward and frontward). After guided by the second guide surface 312, the first boss 120A is guided in the first direction by the third guide surface 313. The protruding part 140 is inserted into the elongated hole 340 in the middle of the first boss 120A being guided by the one side guide surface 310A.

Figure 9B:
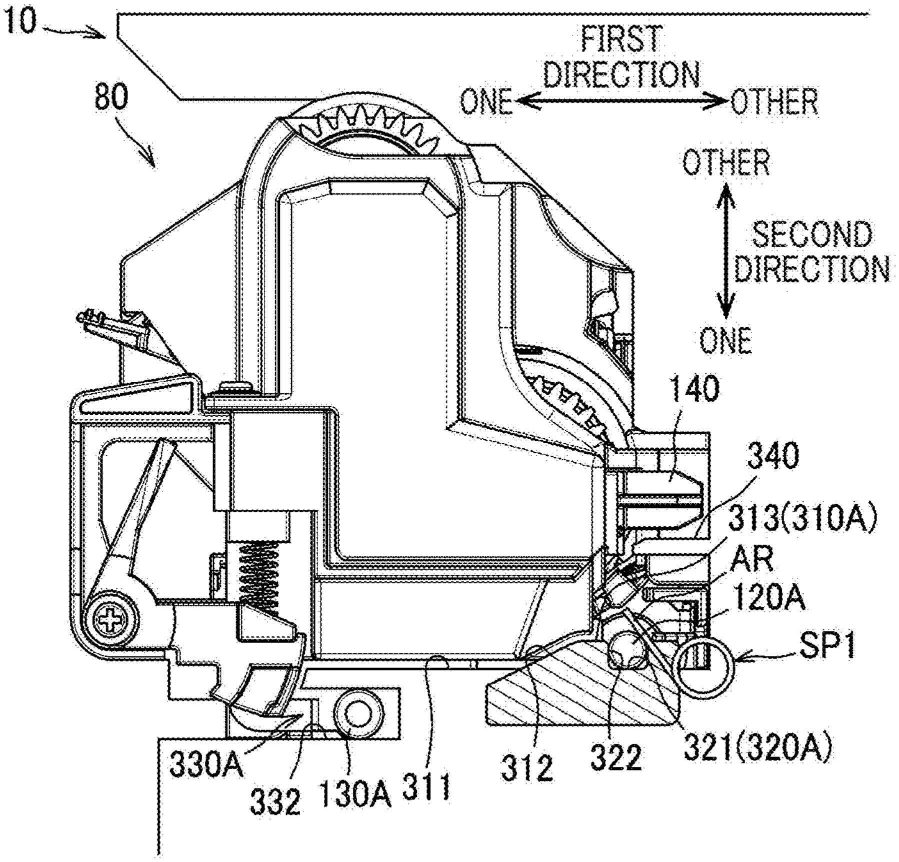
FIG. 9B is a view illustrating the one side portion of the fixing device in the third direction during the attachment of the fixing device to the main body casing, and particularly illustrates a state where the first boss has been inserted in the first recessed portion.

When the first boss 120A comes off the third guide surface 313, the first boss 120A is inserted into the first recessed portion 320A by the urging force of the first spring SP1 as illustrated in FIG. 9B. Specifically, the first boss 120A being guided by the third guide surface 313 pushes the pressing arm AR of the first spring SP1 to elastically deform the pressing arm AR toward the other side in the first direction.

Then, after the first boss 120A comes off the third guide surface 313, the restoring force of the first spring SP1 presses the first boss 120A toward both the one side in the first direction and the one side in the second direction to insert the first boss 120A into the first recessed portion 320A. At this time, the second boss 130A has already been inserted in the second recessed portion 330A.

On the other hand, as illustrated in FIG. 10A, by inserting the fixing device 80 into the main body casing 10, the third boss 120B comes into contact with the first guide surface 311 of the other side guide surface 310B and is guided by the first guide surface 311 in the end portion of the fixing device 80 on the other side in the third direction.

Figure 10B:
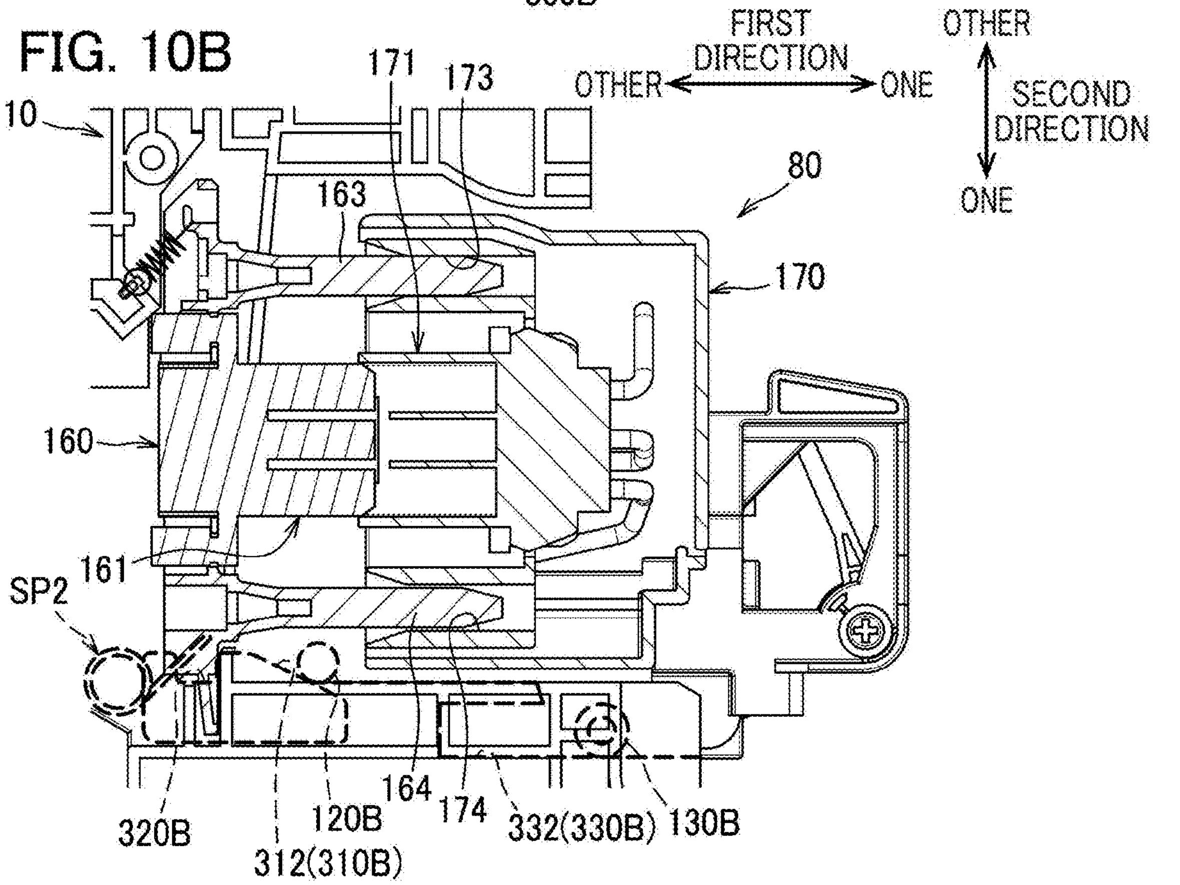
FIG. 10B is a view illustrating the other side portion of the fixing device in the third direction during the attachment of the fixing device to the main body casing, and particularly illustrates a state where a third boss has arrived at a second guide surface.

Further, as illustrated in FIG. 10B, the fourth boss 130B comes into contact with the first restriction surface 332 of the fourth recessed portion 330B and is guided by the first restriction surface 332. In addition, the first guide hole 173 of the unit connector 170 receives the first guide pin 163 of the main body connector 160, and the second guide hole 174 receives the second guide pin 164. When the third boss 120B comes into contact with the second guide surface 312 of the other side guide surface 310B, the third boss 120B is guided by the second guide surface 312 to move toward both the other side in the first direction and the other side in the second direction (i.e., move in a direction diagonally upward and frontward).

As illustrated in FIG. 11A, after guided by the second guide surface 312, the third boss 120B is guided in the first direction by the third guide surface 313 of the other side guide surface 310B. At this time, the unit housing 171 of the unit connector 170 is being fitted into the main body housing 161 of the main body connector 160, and accordingly, the terminals of the unit connector 170 are being electrically connected to the terminals of the main body connector 160.

When the third boss 120B comes off the third guide surface 313 of the other side guide surface 310B, the third boss 120B is inserted into the third recessed portion 320B by the urging force of the second spring SP2 as illustrated in FIG. 11B. Specifically, the third boss 120B being guided by the third guide surface 313 pushes the pressing arm AR of the second spring SP2 to elastically deform the pressing arm AR toward the other side in the first direction.

Then, after the third boss 120B comes off the third guide surface 313, the restoring force of the second spring SP2 presses the third boss 120B toward both the one side in the first direction and the one side in the second direction to insert the third boss 120B into the third recessed portion 320B. At this time, the fourth boss 130B has already been inserted in the fourth recessed portion 330B. Further, the unit housing 171 is fitted to the main body housing 161, and accordingly, the unit connector 170 is connected to the main body connector 160. In this way, the fixing device 80 is attached to the main body casing 10 through the processes described above.

After the fixing device 80 is attached to the main body casing 10, the first boss 120A is pressed against the second reference surface 322 of the first recessed portion 320A by the urging force of the first spring SP1, and the first boss 120A is pressed against the first reference surface 321 of the first recessed portion 320A by gravity and the urging force of the first spring SP1. Further, the third boss 120B is pressed against the second reference surface 322 of the third recessed portion 320B by the urging force of the second spring SP2, and the third boss 120B is pressed against the first reference surface 321 of the third recessed portion 320B by gravity and the urging force of the second spring SP2. In this way, the first boss 120A and the third boss 120B are each pressed against the corresponding first reference surface 321 and second reference surface 322. As a result, the position of the fixing device 80 is fixed relative to the main body casing 10 both in the first direction and in the second direction.

In the present embodiment, during attachment of the fixing device 80 to the main body casing 10, a load is applied to the end portion of the fixing device 80 on the other side in the third direction because of the friction force generated due to the unit connector 170 being connected to the main body connector 160. Therefore, the urging force of the second spring SP2 is smaller than the urging force of the first spring SP1 (see FIG. 7).

Accordingly, the difference between the load required to attach the fixing device 80 to the main body casing 10 at the end portion of the fixing device 80 on the one side in the third direction (hereinafter referred to as a "first load") and the load required to attach the fixing device 80 to the main body casing 10 at the end portion of the fixing device 80 on the other side in the third direction (hereinafter referred to as a "second load") is small. The first load is constituted mainly by a load that is applied by the first spring SP1 when inserting the first boss 120A into the first recessed portion 320A. The second load is constituted mainly by the total of two types of load; one is a load applied by the second spring SP2 when inserting the third boss 120B into the third recessed portion 320B, and the other is a load applied by the friction force generated when connecting the unit connector 170 to the main body connector 160. It is desirable that the first load and the second load is approximately the same.

In other words, the second spring SP2 needs to have an urging force sufficient to fix the position of the third boss 120B (i.e., the fixing device 80) both in the first direction and in the second direction relative to the main body casing 10. However, the load due to the friction force generated when connecting the unit connector 170 to the main body connector 160 is applied to the end portion of the fixing device 80 on the other side in the third direction. Therefore, in the present embodiment, in order to reduce the difference between the first load and the second load, the first spring SP1 and the second spring SP2 are configured such that the urging force of the first spring SP1 is greater than the urging force of the second spring SP2.

Further, since the end portion of the fixing device 80 on the one side in the third direction receives a force from the first drive gear R1 supported by the main body casing 10, the first spring SP1 is configured such that the urging force of the first spring SP1 is greater than the urging force of the second spring SP2.

In addition, as illustrated in FIG. 5, the position of the fixing device 80 in the third direction can be fixed since the protruding part 140 is configured to be inserted into the elongated hole 340.

Next, the technical advantages of the image forming apparatus 1 according to the present embodiment will be described.

The image forming apparatus 1 includes the first spring SP1, which is configured to press the first boss 120A inserted in the first recessed portion 320A toward both the one side in the first direction and the one side in the second direction in the state where the fixing device 80 is attached to the main body casing 10. With this configuration, the first boss 120A is less likely to come off the first recessed portion 320A. Accordingly, the fixing device 80 can be suppressed from moving from an attached position in which the fixing device 80 is attached to the main body casing 10.

The image forming apparatus 1 according to the present embodiment includes: the first spring SP1, which is configured to press the first boss 120A inserted in the first recessed portion 320A toward both the one side in the first direction and the one side in the second direction; and the second spring SP2, which is configured to press the third boss 120B inserted in the third recessed portion 320B toward both the one side in the first direction and the one side in the second direction. Therefore, each of the first boss 120A and the third boss 120B is less likely to come off the corresponding one of the first recessed portion 320A and the third recessed portion 320B. Accordingly, the fixing device 80 can be further suppressed from moving from the attached position.

In the present embodiment, the distance D1 between the second reference surface 322 and the stopper surface 323 is greater than the dimension of the first boss 120A in a direction orthogonal to the third direction. This structure can achieve a configuration in which the first boss 120A is not in contact with the stopper surface 323 in a state where the first boss 120A is pressed by the spring SP1.

Further, in a state where the first boss 120A is pressed by the first spring SP1 and the third boss 120B is pressed by the second spring SP2, the first boss 120A is not in contact with the stopper surface 323 of the first recessed portion 320A and the third boss 120B is not in contact with the stopper surface 323 of the third recessed portion 320B. Therefore, the accuracy of the fixing of the fixing device 80 in position relative to the main body casing 10 is less susceptible to the dimensional accuracies of the first recessed portion 320A and third recessed portion 320B. Accordingly, the position of the fixing device 80 can be accurately fixed relative to the main body casing 10.

Further, in the state where the first boss 120A is pressed by the first spring SP1 and the third boss 120B is pressed by the second spring SP2, the first boss 120A is in contact with the first reference surface 321 and second reference surface 322 of the first recessed portion 320A and the third boss 120B is in contact with the first reference surface 321 and second reference surface 322 of the third recessed portion 320B. Therefore, the positions of the first boss 120A and third boss 120B can be fixed with the first boss 120A and third boss 120B in contact with the corresponding two surfaces. Accordingly, the position of the fixing device 80 can be accurately fixed relative to the main body casing 10.

Further, the first spring SP1 and the second spring SP2 are torsion coil springs. Accordingly, the pressing force and the stroke of each of the first spring SP1 and the second spring SP2 can be adjusted properly.

Further, the second guide surface 312 of the one side guide surface 310A and the second guide surface 312 of the other side guide surface 310B are inclined so as to approach the other side in the second direction as extending in the first direction from the one side toward the other side. In other words, the second guide surfaces 312 are inclined diagonally toward both the other side in the first direction and the other side in the second direction. Thus, the position of the first guide surface 311 of the one side guide surface 310A in the second direction can be made approximately identical to the position of the first recessed portion 320A in the second direction, and the position of the first guide surface 311 of the other side guide surface 310B in the second direction can be made approximately identical to the position of the third recessed portion 320B in the second direction. Accordingly, the posture of the fixing device 80 when the first boss 120A and the third boss 120B are being guided by the first guide surfaces 311 during attachment of the fixing device 80 to the main body casing 10 can be approximately the same as the posture of the fixing device 80 in a state where the attachment has been completed and the first boss 120A and the third boss 120B are inserted in the first recessed portion 320A and the third recessed portion 320B, respectively.

Further, the first recessed portion 320A and the third recessed portion 320B are formed in the first metal plate 300A and the second metal plate 300B, respectively. The first metal plate 300A and the second metal plate 300B are provided in the main body casing 10. Therefore, the position of the fixing device 80 can be fixed relative to the first metal plate 300A and the second metal plate 300B, which have high rigidity.

Further, the first boss 120A is fixed to the first side plate 110A by caulking (by riveting), and the first metal plate 300A is positioned further toward the one side in the third direction than the first side plate 110A. In addition, the first spring SP1 presses the first boss 120A at a position further toward the one side in the third direction than the first metal plate 300A. This configuration can reduce the load exerted on the caulked portion of the first boss 120A compared to a configuration in which a spring presses the first boss 120A at a position between the first metal plate 300A and the first side plate 110A.

Similarly, the third boss 120B is fixed to the second side plate 110B by caulking (by riveting), and the second metal plate 300B is positioned further toward the other side in the third direction than the second side plate 110B. In addition, the second spring SP2 presses the third boss 120B at a position further toward the other side in the third direction than the second metal plate 300B. This configuration can reduce the load applied to the caulked portion of the third boss 120B.

Further, the first boss 120A and the third boss 120B are positioned further toward the other side in the first direction than the nip position NP between the heating roller 81 and the pressure roller 82. Thus, the position of the fixing device 80 relative to the main body casing 10 can be fixed using the leading side portion of the fixing device 80 in the attachment direction (i.e., the end portion of the fixing device 80 in the first direction on the other side in the first direction) as a reference.

Further, the fixing device 80 includes the second boss 130A and the fourth boss 130B, and the main body casing 10 has the second recessed portion 330A and the fourth recessed portion 330B. Hence, in a state where the second boss 130A and the fourth boss 130B are inserted into the second recessed portion 330A and the fourth recessed portion 330B, respectively, the fixing device 80 can be restricted from rotating about the first boss 120A and the third boss 120B.

Further, the fixing device 80 includes the protruding part 140, and the main body casing 10 has the elongated hole 340 configured to restrict the protruding part 140 from moving in the third direction. Hence, the fixing device 80 can be restricted from moving in the third direction. Accordingly, the position of the fixing device 80 in the third direction can be fixed relative to the main body casing 10. In addition, the protruding part 140 is positioned at the end portion of the fixing device 80 on the one side in the third direction. Accordingly, position of the fixing device 80 in the third direction can be fixed at a position near the first input gear R2.

Further, the dimension of the elongated hole 340 in the second direction is greater than the dimension of the protruding part 140 in the second direction. With this configuration, the protruding part 140 can be suppressed from interfering with the main body casing 10 even when the fixing device 80 moves in the second direction during attachment of the fixing device 80 to the main body casing 10. In addition, the tip end part of the protruding part 140 is thin, thereby facilitating insertion of the protruding part 140 into the elongated hole 340. As a result, the fixing device 80 can be suppressed from experiencing large displacement in the second direction.

Further, the force component F11 of the force F1, with which the first spring SP1 presses the first boss 120A, is greater than the force component F31 of the force F3, with which, the first drive gear R1 presses the first input gear R2.

This configuration can suppress the first boss 120A from moving toward the other side in the first direction when the first drive gear R1 rotates.

Further, the difference between the first load required to attach the fixing device 80 to the main body casing 10 at the end portion of the fixing device 80 on the one side in the third direction and the second load required to attach the fixing device 80 to the main body casing 10 at the end portion of the fixing device 80 on the other side in the third direction is small. With this configuration, the fixing device 80 can be suppressed from being skewed when being attached to the main body casing 10, thereby facilitating attachment of the fixing device 80 to the main body casing 10.

While the invention has been described in conjunction with the example structure outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below, wherein like parts and components to those in the above embodiment are designated with the same reference numerals to avoid duplicating description.

In the above-described embodiment, the first spring SP1 is a torsion coil spring. However, a leaf spring or a compression coil spring may be employed as the spring for pressing the boss, for example. The same is true with respect to the second spring SP2.

In the above-described embodiment, the first side plate 110A of the fixing device 80 supports the heating roller 81 (the heating rotary body). However, the first side plate 110A may support the pressure roller 82 (the pressure rotary body), for example. Alternatively, the first side plate 110A may support both the heating roller 81 (the heating rotary body) and the pressure roller 82 (the pressure rotary body). The same is true with respect to the second side plate 110B.

In the above-described embodiment, the first input gear R2 drives the heating roller 81 (the heating rotary body), and the pressure roller 82 (the pressure rotary body) rotates following the rotation of the heating roller 81. Alternatively, the first input gear R2 may directly drive the pressure roller 82 (the pressure rotary body), and the heating roller 81 (the heating rotary body) may rotate following the rotation of the pressure roller 82.

In the above-described embodiment, the second direction is orthogonal to the first direction. However, the second direction need not necessarily be orthogonal to the first direction, for example. In other words, the first recessed portion 320A of the above-described embodiment is recessed toward the bottom portion of the image forming apparatus 1, but may be recessed diagonally downward and frontward, for example. The same is true for the third recessed portion 320B. Further, in the above-described embodiment, the first direction, in which the fixing device 80 is attached to and detached from the main body casing 10, is along the front-rear direction of the image forming apparatus 1. However, the first direction may be a direction that slopes relative to the horizontal direction, for example.

In the above-described embodiment, the first side plate 110A is made of a metal. Alternatively, the first side plate 110A may be made of a resin, for example. Further, in the above-described embodiment, the first boss 120A is made of a metal. However, the first boss 120A may be made of a resin, for example. In addition, the first boss 120A and the first side plate 110A may be formed as a single member. Furthermore, the fixing device 80 need not necessarily be provide with the first side plate 110A, and the first boss 120A may be provided at the frame of the fixing device 80. The same is true for the second side plate 110B and the third boss 120B.

In the above-described embodiment, the first metal plate 300A is configured of the first portion 301 that is orthogonal to the third direction. However, the first metal plate 300A is configured of the first portion 301 and a second portion extending from the first portion 301 in the third direction. The same is true with respect to the second metal plate 300B.

In the above-described embodiment, the first boss 120A is configured such that the first boss 120A contacts the first reference surface 321 and second reference surface 322 of the first recessed portion 320A but does not contact the stopper surface 323. However, the first boss 120A may be configured to contact all the three surfaces of the first recessed portion 320A, for example. Further, the first boss 120A may be configured to be fitted in the first recessed portion 320A. The same is true for the third boss 120B and the third recessed portion 320B.

In the above-described embodiment, the elongated hole 340 (the hole) is a hole with a closed bottom. However, the hole (the elongated hole 340) in which the protruding part 140 of the fixing device 80 is inserted may be a through-hole extending in the first direction.

In the above-described embodiment, the heating roller 81 is employed as an example of the heating rotary body. However, a heating belt or a heating film may be employed as the heating rotary body instead of the heating roller 81, for example. Further, the pressure roller 82 is employed as an example of the pressure rotary body in the above-described embodiment. However, an endless belt interposed between the heating rotary body and an elastic pad may be employed as the pressure rotary body instead of the pressure roller 82, for example.

In the above-described embodiment, the image forming apparatus 1 is a printer configured to form color images. However, the image forming apparatus 1 may be a printer configured to form only monochrome images, for example. Further, the image forming apparatus 1 may be a copier or multifunction peripheral, for example.

The elements described in the above embodiment and its variations may be implemented in any combination.

What is claimed is:

1. An image forming apparatus comprising:

a main body casing; and a fixing device comprising a heating rotary body and a pressure rotary body, the fixing device being attachable to the main body casing from one side toward an other side in a first direction, wherein the main body casing comprises a first recessed portion recessed toward one side in a second direction crossing the first direction, and wherein the fixing device further comprises a first boss extending in a third direction crossing both the first direction and the second direction, the first boss being configured to be inserted in the first recessed portion in a state where the fixing device is attached to the main body casing, the image forming apparatus further comprising:

a spring configured to press, in the state where the fixing device is attached to the main body casing, the first boss inserted in the first recessed portion toward both the one side in the first direction and the one side in the second direction.

2. The image forming apparatus according to claim 1, wherein the first recessed portion has a surface on the one side in the first direction and a surface on the other side in the first direction, wherein a distance between the surface of the first recessed portion on the one side in the first direction and the surface of the first recessed portion on the other side in the first direction is greater than a dimension of the first boss in a direction orthogonal to the third direction, and wherein, in a state where the first boss is pressed by the spring, the first boss is not in contact with the surface of the first recessed portion on the other side in the first direction.

3. The image forming apparatus according to claim 1, wherein the first recessed portion has a surface on the one side in the first direction and a surface on the one side in the second direction, and wherein, in a state where the first boss is pressed by the spring, the first boss is in contact with both the surface of the first recessed portion on the one side in the first direction and the surface of the first recessed portion on the one side in the second direction.

4. The image forming apparatus according to claim 1, wherein the spring is a torsion coil spring.

5. The image forming apparatus according to claim 1, wherein the main body casing further comprises a guide surface configured to guide the first boss toward the first recessed portion during attachment of the fixing device to the main body casing, and wherein the guide surface comprises:

a first guide surface extending in the first direction; and a second guide surface positioned between the first guide surface and the first recessed portion, the second guide surface being inclined so as to approach an other side in the second direction as extending from the one side toward the other side in the first direction.

6. The image forming apparatus according to claim 1, wherein the main body casing further comprises a metal plate having a first portion orthogonal to the third direction, and wherein the first recessed portion is formed in the first portion.

7. The image forming apparatus according to claim 6, wherein the fixing device further comprises a side plate supporting at least one of the heating rotary body and the pressure rotary body, the side plate being positioned at an end portion of the heating rotary body on one side in the third direction, the side plate being positioned further toward the one side in the third direction than the pressure rotary body, wherein the first boss is fixed to the side plate, wherein the metal plate is positioned further toward the one side in the third direction than the side plate, and wherein the spring is configured to press the first boss at a position further toward the one side in the third direction than the metal plate.

8. The image forming apparatus according to claim 7, wherein the side plate is made of metal, wherein the first boss is a metal rod, and wherein the first boss is fixed to the side plate by caulking.

9. The image forming apparatus according to claim 1, wherein the first boss is positioned further toward the other side in the first direction than a nip position between the heating rotary body and the pressure rotary body.

10. The image forming apparatus according to claim 9, wherein the main body casing further comprises a second recessed portion recessed toward the other side in the first direction, and wherein the fixing device further comprises a second boss extending in the third direction, the second boss being positioned further toward the one side in the first direction than the nip position, the second boss being configured to be inserted in the second recessed portion in the state where the fixing device is attached to the main body casing.

11. The image forming apparatus according to claim 1, wherein the fixing device further comprises a protruding part protruding toward the other side in the first direction, and wherein the main body casing further has a hole in which the protruding part is inserted in the state where the fixing device is attached to the main body casing, the hole being configured to restrict the protruding part from moving in the third direction.

12. The image forming apparatus according to claim 11, wherein a dimension of the hole in the second direction is greater than a dimension of the protruding part in the second direction.

* * * * *